(12) United States Patent
Ogawa et al.

(10) Patent No.: US 10,047,289 B2
(45) Date of Patent: *Aug. 14, 2018

(54) LIQUID CRYSTAL DISPLAY DEVICE

(71) Applicant: DIC Corporation, Tokyo (JP)

(72) Inventors: Shinji Ogawa, Kita-adachi-gun (JP); Yoshinori Iwashita, Kita-adachi-gun (JP)

(73) Assignee: DIC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/035,354

(22) PCT Filed: Nov. 4, 2014

(86) PCT No.: PCT/JP2014/079196
§ 371 (c)(1),
(2) Date: May 9, 2016

(87) PCT Pub. No.: WO2015/072368
PCT Pub. Date: May 21, 2015

(65) Prior Publication Data
US 2016/0289560 A1 Oct. 6, 2016

(30) Foreign Application Priority Data
Nov. 12, 2013 (JP) .................................. 2013-233958

(51) Int. Cl.
| | | |
|---|---|---|
| *G02F 1/1333* | (2006.01) | |
| *C09K 19/30* | (2006.01) | |
| *C09K 19/04* | (2006.01) | |
| *C09K 19/32* | (2006.01) | |
| *G02F 1/1368* | (2006.01) | |
| *C09K 19/56* | (2006.01) | |
| *G02F 1/1337* | (2006.01) | |
| *G02F 1/1343* | (2006.01) | |

(Continued)

(52) U.S. Cl.
CPC ...... *C09K 19/3066* (2013.01); *C09K 19/0403* (2013.01); *C09K 19/3003* (2013.01); *C09K 19/322* (2013.01); *C09K 19/56* (2013.01); *G02F 1/1337* (2013.01); *G02F 1/1368* (2013.01); *G02F 1/13439* (2013.01); *G02F 1/133365* (2013.01); *G02F 1/136286* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *G02F 2001/133738* (2013.01); *G02F 2201/121* (2013.01); *G02F 2201/123* (2013.01); *G02F 2202/10* (2013.01)

(58) Field of Classification Search
CPC ............ C09K 19/3006; C09K 19/0403; C09K 19/322; C09K 19/3003; C09K 19/56; C09K 2019/0448; C09K 2019/0466; C09K 2019/122; C09K 2019/123; C09K 2019/3004; C09K 2019/3009; C09K 2019/3016; C09K 2019/301; C09K 2019/3019; C09K 2019/3021; G02F 1/1333; G02F 1/1368; G02F 1/13365; G02F 1/1337; G02F 1/13439; G02F 1/136286; G02F 2001/133738; G02F 2201/121; G02F 2201/123; G02F 2202/10
USPC .......................................... 428/1.1; 349/182
See application file for complete search history.

(56) References Cited

U.S. PATENT DOCUMENTS

| | | | |
|---|---|---|---|
| 8,368,067 B2 * | 2/2013 | Uchiyama | ......... H01L 21/28291 257/103 |
| 8,860,912 B2 | 10/2014 | Kaneoya et al. | |

(Continued)

FOREIGN PATENT DOCUMENTS

| | | |
|---|---|---|
| CN | 101133138 A | 2/2008 |
| CN | 102264867 A | 11/2011 |

(Continued)

OTHER PUBLICATIONS

International Search Report dated Jan. 27, 2015, issued in counterpart International Application No. PCT/JP2014/079196 (1 page).
K. Nomura, et al. "Room-temperature fabrication of transparent flexible thin-film transistors using amorphous oxide semiconductors", Nature Publishing Group, vol. 432, 2004, p. 488-492.
Final Office Action dated Aug. 15, 2017, issued in U.S. Appl. No. 15/033,535.
Non-Final Office Action dated Jan. 2, 2018, issued in U.S. Appl. No. 15/033,535.
International Search Report dated Jan. 27, 2015, issued in counterpart International Application No. PCT/JP2014/079197.
International Search Report dated Aug. 20, 2013, issued in counterpart application No. PCT/JP2013/065713.
Non-Final Office Action dated Apr. 21, 2017, issued in U.S. Appl. No. 15/035,652.
Final Office Action dated Aug. 16, 2017, issued in U.S. Appl. No. 15/035,652.
Non-Final Office Action dated Jan. 13, 2017, issued in U.S. Appl. No. 15/033,535.

*Primary Examiner* — Geraldina Visconti
(74) *Attorney, Agent, or Firm* — Westerman, Hattori, Daniels & Adrian, LLP

(57) ABSTRACT

Provided is a liquid crystal display device including first and second opposing substrates, a liquid crystal layer containing a liquid crystal composition between the first and second substrates, a plurality of gate lines and data lines arranged in a matrix on the first substrate, thin-film transistors disposed at intersections of the gate lines and the data lines, and pixel electrodes that are driven by the transistors and that are made of a transparent conductive material. Each thin-film transistor includes a gate electrode, an oxide semiconductor layer disposed over the gate electrode with an insulating layer therebetween, and source and drain electrodes electrically connected to the oxide semiconductor layer. The liquid crystal composition contains at least one compound selected from the group consisting of compounds represented by general formulas (LC1) and (LC2) and at least one compound selected from the group consisting of compounds represented by general formulas (II-a) to (II-f).

12 Claims, 6 Drawing Sheets

(51) Int. Cl.
*G02F 1/1362* (2006.01)
*C09K 19/12* (2006.01)

(56) References Cited

U.S. PATENT DOCUMENTS

| | | | |
|---|---|---|---|
| 8,885,124 B2 | 11/2014 | Kaneoya et al. | |
| 8,961,823 B2 * | 2/2015 | Gotoh | C09K 19/3838 252/299.62 |
| 9,120,968 B2 | 9/2015 | Kaneoya et al. | |
| 2005/0280762 A1 | 12/2005 | Lee et al. | |
| 2006/0257763 A1 | 11/2006 | Araki | |
| 2009/0309066 A1 | 12/2009 | Klasen-Memmer et al. | |
| 2010/0140614 A1 | 6/2010 | Uchiyama et al. | |
| 2010/0271569 A1 | 10/2010 | Ohkuma et al. | |
| 2011/0193020 A1 | 8/2011 | Klasen-Memmer et al. | |
| 2011/0248216 A1 | 10/2011 | Klasen-Memmer et al. | |
| 2011/0297881 A1 | 12/2011 | Hirata et al. | |
| 2012/0236246 A1 | 9/2012 | Furusato et al. | |
| 2013/0169906 A1 | 7/2013 | Nakanishi et al. | |
| 2013/0183460 A1 | 7/2013 | Klasen-Memmer et al. | |
| 2013/0193377 A1 | 8/2013 | Saigusa et al. | |
| 2013/0265527 A1 | 10/2013 | Takeuchi et al. | |
| 2014/0104524 A1 | 4/2014 | Lee et al. | |
| 2014/0218667 A1 | 8/2014 | Miyachi et al. | |
| 2015/0002773 A1 | 1/2015 | Ogawa et al. | |
| 2016/0060522 A1 | 3/2016 | Kurisawa et al. | |
| 2016/0272889 A1 * | 9/2016 | Ogawa | C09K 19/0403 |

FOREIGN PATENT DOCUMENTS

| | | |
|---|---|---|
| JP | 2000-019321 A | 1/2000 |
| JP | 2000-192040 A | 7/2000 |
| JP | 2002-309255 A | 10/2002 |
| JP | 2005-281559 A | 10/2005 |
| JP | 2006-165528 A | 6/2006 |
| JP | 2006-317602 A | 11/2006 |
| JP | 2007-96055 A | 4/2007 |
| JP | 2009-058546 A | 3/2009 |
| JP | 2009-109542 A | 5/2009 |
| JP | 2009-163014 A | 7/2009 |
| JP | 2010-189560 A | 9/2010 |
| JP | 2010-250117 A | 11/2010 |
| JP | 2010-256509 A | 11/2010 |
| JP | 2011-141356 A | 7/2011 |
| JP | 2011-186043 A | 9/2011 |
| JP | 5170602 B1 | 3/2013 |
| JP | 2013-144796 A | 7/2013 |
| JP | 2013-173915 A | 9/2013 |
| JP | S52-88224 B1 | 9/2013 |
| KR | 20120048434 A | 5/2012 |
| TW | 2008-29965 A | 7/2008 |
| TW | 2011-24479 A | 7/2011 |
| TW | 201139343 A | 11/2011 |
| TW | 2011-42502 A | 12/2011 |
| TW | 2012-45426 A | 11/2012 |
| TW | 2013-21484 A | 6/2013 |
| WO | 2010/095506 A1 | 8/2010 |
| WO | 2011/092973 A1 | 8/2011 |
| WO | 2012/117875 A1 | 9/2012 |
| WO | 2013024749 A1 | 2/2013 |
| WO | 2013/115164 A1 | 8/2013 |
| WO | 2013/133383 A1 | 9/2013 |

* cited by examiner

LIQUID CRYSTAL DISPLAY DEVICE

TECHNICAL FIELD

The present invention relates to liquid crystal display devices.

BACKGROUND ART

Liquid crystal display devices are used in various products, including clocks, calculators, household electrical appliances, measuring instruments, automotive instrument panels, word processors, electronic organizers, printers, computers, and televisions. Typical types of liquid crystal display devices include twisted nematic (TN), super-twisted nematic (STN), dynamic scattering (DS), guest-host (GH), in-plane switching (IPS), fringe-field switching (FFS), optically compensated birefringence (OCB), electrically controlled birefringence (ECB), vertically aligned (VA), color super-homeotropic (CSH), and ferroelectric liquid crystal (FLC) display devices. Although conventional liquid crystal display devices are statically driven, multiplexed liquid crystal display devices have been commonly used. Among the mainstream schemes are passive-matrix driving and, more recently, active-matrix (AM) driving with elements such as thin-film transistors (TFTs) and thin-film diodes (TFDs).

Silicon-based semiconductors are known for use in thin-film transistors for active-matrix driving. Recently, thin-film transistors fabricated from oxide semiconductors, such as zinc oxide and In—Ga—Zn—O, have also attracted attention for use in liquid crystal display devices (see PTL 1). Oxide semiconductor thin-film transistors have higher field-effect mobilities than silicon-based thin-film transistors and thus allow for improved display device performance and reduced power consumption. Accordingly, liquid crystal device manufacturers are focusing their efforts on the development of oxide semiconductor thin-film transistors, including the use of arrays thereof.

Unfortunately, oxide semiconductor thin-film transistors have low reliability due to variations in electrical characteristics. The variations in electrical characteristics are attributable to lattice defects, such as oxygen defects, which occur when oxygen desorbs from an oxide semiconductor layer. As a solution to this problem, a method has been researched that involves controlling the oxygen atmosphere conditions during the deposition of an oxide semiconductor to reduce the electron carrier concentration so that fewer oxygen defects occur (see PTL 2).

A liquid crystal composition used for a liquid crystal layer of a liquid crystal display device is subjected to strict impurity control since impurities present in the composition greatly affect the electrical characteristics of the display device. It is also known that impurities remaining in the material used for alignment layers, which directly contact the liquid crystal layer, migrate into the liquid crystal layer and affect the electrical characteristics thereof. Accordingly, research has been conducted on the influence of impurities in alignment layer materials on the characteristics of liquid crystal display devices.

Although research has been conducted on various solutions to the problem of lattice defects such as oxygen defects, as discussed in PTL 2, they have been unsuccessful in sufficiently reducing the desorption of oxygen from an oxide semiconductor layer. As oxygen desorbs from an oxide semiconductor layer, it diffuses into and alters an insulating layer covering the oxide semiconductor layer. A typical liquid crystal display device includes only a thin insulating layer, or a thin insulating layer and a thin alignment layer, between oxide semiconductor layers of thin-film transistors and a liquid crystal layer to separate the liquid crystal composition from the oxide semiconductor layer; therefore, the diffusion of oxygen desorbed from the oxide semiconductor layer and the resulting alteration of the insulating layer result in insufficient separation of the liquid crystal layer from the oxide semiconductor layer. As a result, the oxygen desorbed from the oxide semiconductor layer will affect the liquid crystal layer. The diffusion of impurities such as oxygen desorbed from the oxide semiconductor layer into the liquid crystal layer may decrease the voltage holding ratio (VHR) and increase the ion density (ID) of the liquid crystal layer and may thus cause display defects such as white spots, uneven alignment, and image-sticking.

However, as disclosed in PTL 2, the previous inventions are intended to reduce the desorption of oxygen from oxide semiconductors; no research has been conducted on the direct relationship between oxide semiconductor thin-film transistors and liquid crystal compositions.

CITATION LIST

Patent Literature

PTL 1: Japanese Unexamined Patent Application Publication No. 2007-96055

PTL 2: Japanese Unexamined Patent Application Publication No. 2006-165528

SUMMARY OF INVENTION

Technical Problem

Accordingly, an object of the present invention is to provide a liquid crystal display device, including an oxide semiconductor, that does not exhibit a significant decrease in voltage holding ratio (VHR) or increase in ion density (ID) of the liquid crystal layer and thus does not suffer from the problem of display defects such as white spots, uneven alignment, and image-sticking.

Solution to Problem

To achieve the foregoing object, the inventors have conducted extensive research on various liquid crystal compositions suitable for liquid crystal display devices including oxide semiconductor thin-film transistors. As a result, the inventors have discovered that a liquid crystal display device including a liquid crystal layer containing a particular liquid crystal composition does not exhibit a significant decrease in voltage holding ratio (VHR) or increase in ion density (ID) of the liquid crystal layer and thus does not suffer from the problem of display defects such as white spots, uneven alignment, and image-sticking and also consumes less power. This discovery has led to the present invention.

Specifically, the present invention provides a liquid crystal display device including first and second opposing substrates, a liquid crystal layer containing a liquid crystal composition between the first and second substrates, a plurality of gate lines and data lines arranged in a matrix on the first substrate, thin-film transistors disposed at intersections of the gate lines and the data lines, and pixel electrodes that are driven by the transistors and that are made of a transparent conductive material. Each thin-film transistor includes a gate electrode, an oxide semiconductor layer disposed over the gate electrode with an insulating layer therebetween, and source and drain electrodes electrically connected to the oxide semiconductor layer. The liquid crystal composition contains at least one compound selected from the group consisting of compounds represented by general formulas (LC1) and (LC2).

[Chem. 1]

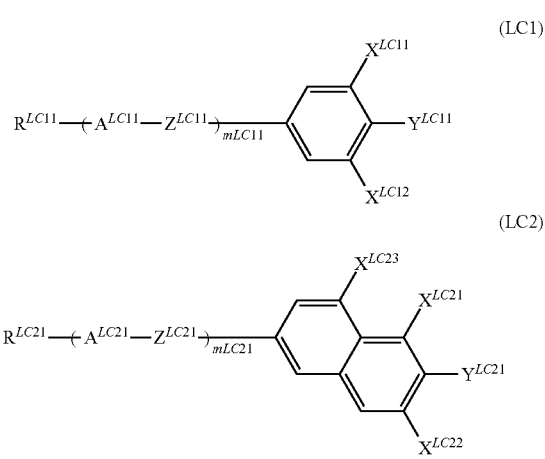

In the formulas, $R^{LC11}$ and $R^{LC21}$ are each independently an alkyl group of 1 to 15 carbon atoms, where one or more —CH$_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen. $A^{LC11}$ and $A^{LC21}$ are each independently any of the following structures.

[Chem. 2]

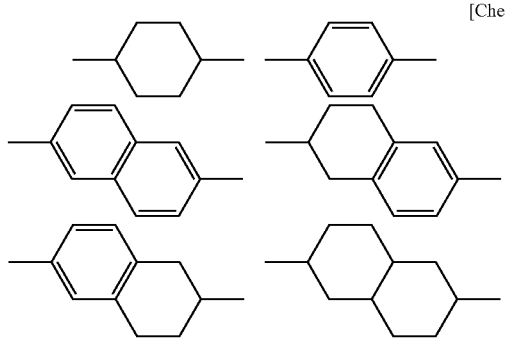

In the structures, one or more —CH$_2$— groups in the cyclohexylene group are optionally replaced with oxygen; one or more —CH= groups in the 1,4-phenylene group are optionally replaced with nitrogen; and one or more hydrogen atoms in the structures are optionally replaced with fluorine, chlorine, —CF$_3$, or —OCF$_3$. $X^{LC11}$, $X^{LC12}$, and $X^{LC21}$ to $X^{LC23}$ are each independently hydrogen, chlorine, fluorine, —CF$_3$, or —OCF$_3$. $Y^{LC11}$ and $Y^{LC21}$ are each independently hydrogen, chlorine, fluorine, cyano, —CF$_3$, —OCH$_2$F, —OCHF$_2$, or —OCF$_3$. $Z^{LC11}$ and $Z^{LC21}$ are each independently a single bond, —CH=CH—, —CF=CF—, —C≡C—, —CH$_2$CH$_2$—, —(CH$_2$)$_4$—, —OCH$_2$—, —CH$_2$O—, —OCF$_2$—, —CF$_2$O—, —COO—, or —OCO—. $m^{LC11}$ and $m^{LC21}$ are each independently an integer of 1 to 4. Each occurrence of $A^{LC11}$, $A^{LC21}$, $Z^{LC11}$, and $Z^{LC21}$, if present, may be the same or different. The liquid crystal composition further contains at least one compound selected from the group consisting of compounds represented by general formulas (II-a) to (II-f).

[Chem. 3]

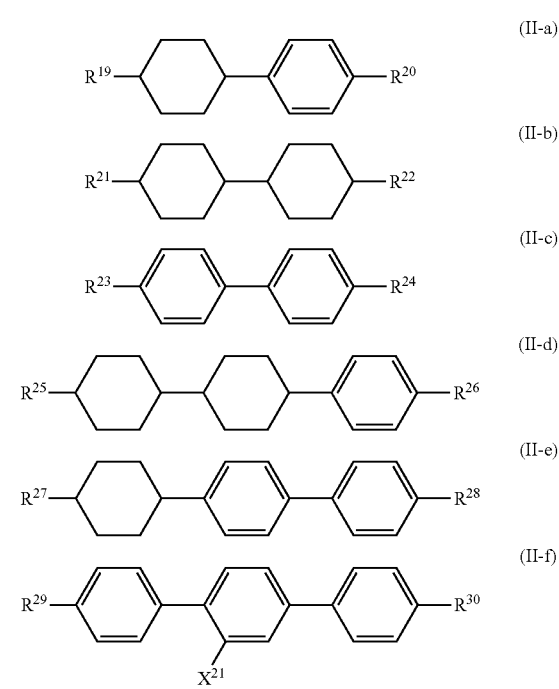

In the formulas, $R^{19}$ to $R^{30}$ are each independently an alkyl group of 1 to 10 carbon atoms, an alkoxy group of 1 to 10 carbon atoms, or an alkenyl group of 2 to 10 carbon atoms; and $X^{21}$ is hydrogen or fluorine.

Advantageous Effects of Invention

The liquid crystal display device according to the present invention, which includes oxide semiconductor TFTs and a particular liquid crystal composition, does not exhibit a significant decrease in voltage holding ratio (VHR) or increase in ion density (ID) of the liquid crystal layer and thus does not suffer from display defects such as white spots, uneven alignment, and image-sticking and also consumes less power.

DESCRIPTION OF EMBODIMENTS

First Embodiment

A liquid crystal display device according to a first preferred embodiment of the present invention includes oxide semiconductor thin-film transistors and a particular liquid crystal composition and generates a substantially perpendicular electric field between first and second substrates. The liquid crystal display device according to the first preferred embodiment is a liquid crystal display device having electrodes on both first and second substrates, for example, a twisted nematic (TN) transmissive liquid crystal display device.

The liquid crystal display device according to the first preferred embodiment of the present invention preferably includes first and second opposing substrates, a liquid crystal layer containing a liquid crystal composition between the first and second substrates, a plurality of gate bus lines and data bus lines arranged in a matrix on the first substrate, thin-film transistors disposed at intersections of the gate bus lines and the data bus lines, and pixel electrodes that are driven by the transistors and that are made of a transparent conductive material. Each thin-film transistor preferably includes a gate electrode, an oxide semiconductor layer disposed over the gate electrode with an insulating layer therebetween, and source and drain electrodes electrically connected to the oxide semiconductor layer. The liquid crystal display device preferably further includes a common electrode made of a transparent conductive material on the second substrate. The liquid crystal layer is preferably homogeneously aligned when no voltage is applied. The alignment direction is preferably twisted between the first and second substrates.

Figure 1:
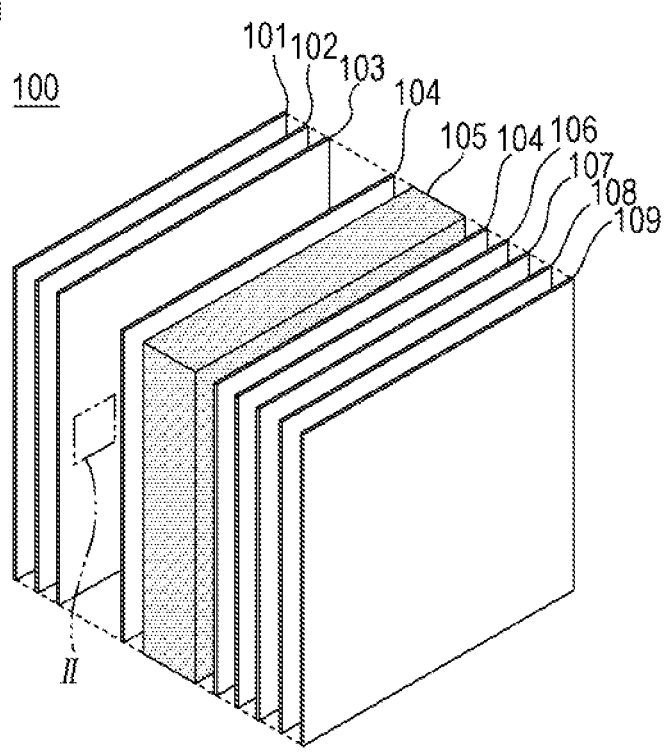
FIG. 1 is a schematic exploded perspective view illustrating the structure of a liquid crystal display device.
Figure 2:
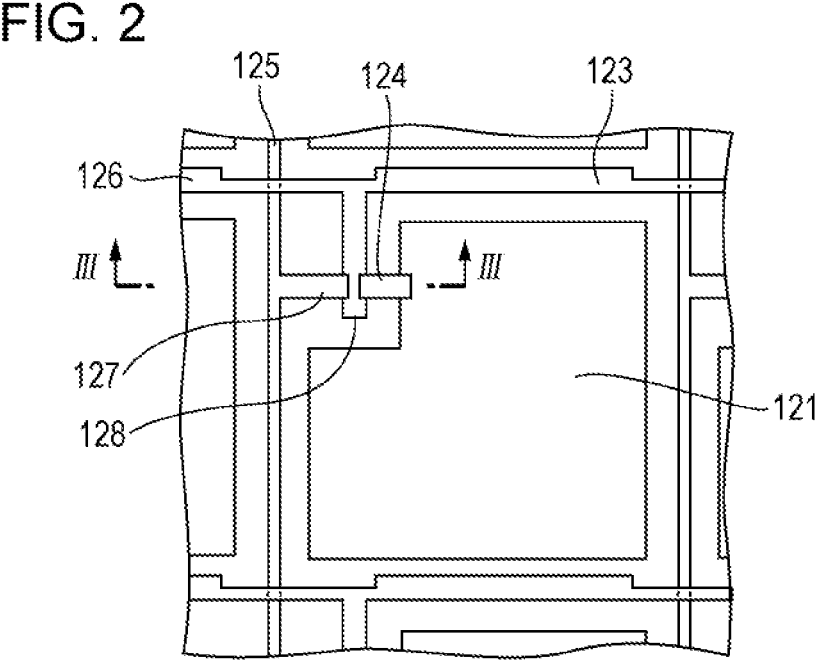
FIG. 2 is an enlarged plan view of an area enclosed by line II of an electrode including thin-film transistors formed on a substrate in FIG. 1.
Figure 3:
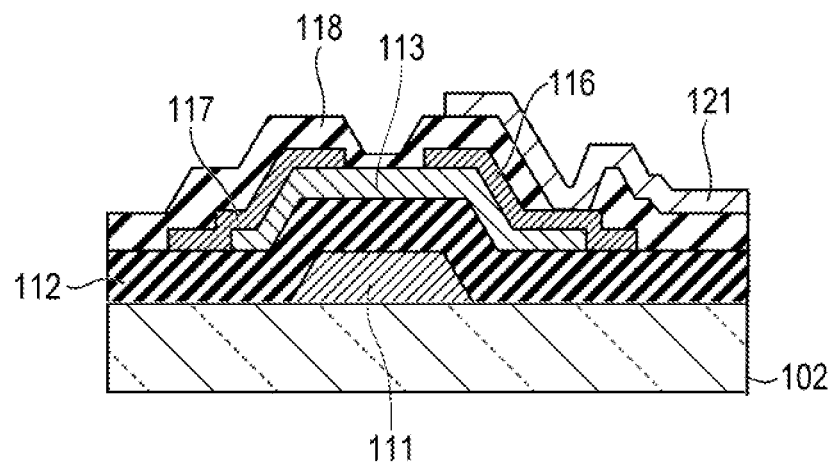
FIG. 3 is an example of a sectional view of the thin-film transistor layer 103 taken along line III-III in FIG. 2.

An example liquid crystal display device according to the first embodiment is illustrated in FIGS. 1 to 3. FIG. 1 is a schematic exploded perspective view illustrating the structure of a liquid crystal display device. In FIG. 1, various elements are shown as being separated for illustration purposes. FIG. 2 is an enlarged plan view of an area enclosed by line II of an electrode layer 103 including thin-film transistors (also referred to as "thin-film transistor layer 103") formed on a substrate in FIG. 1. FIG. 3 is a sectional view of the thin-film transistor layer 103 taken along line III-III in FIG. 2. The liquid crystal display device according to the present invention will now be described with reference to FIGS. 1 to 3.

As shown in FIG. 1, a liquid crystal display device 100 according to the present invention includes a second substrate 108 having a transparent electrode (layer) 106 (also referred to as "common electrode 106") made of a transparent conductive material; a first substrate 102 having a thin-film transistor layer 103 including pixel electrodes disposed in individual pixels and made of a transparent conductive material and thin-film transistors that control the pixel electrodes; and a liquid crystal composition (also referred to as "liquid crystal layer 105") disposed between the first substrate 102 and the second substrate 108. The liquid crystal molecules in the liquid crystal composition are aligned substantially parallel to the substrates 102 and 108 when no voltage is applied. The liquid crystal display device 100 is characterized by the use of oxide semiconductor TFTs and a particular liquid crystal composition, as described later. By "the liquid crystal molecules in the liquid crystal composition are aligned substantially parallel to the substrates 102 and 108 when no voltage is applied", it is meant that the liquid crystal composition is homogeneously aligned when no voltage is applied.

As shown in FIG. 1, the first substrate 102 and the second substrate 108 may be disposed between a pair of polarizers 101 and 109. In FIG. 1, a color filter 107 is disposed between the second substrate 109 and the common electrode 106. A pair of alignment layers 104 may be formed on the thin-film transistor layer 103 and the transparent electrode (layer) 106 such that the alignment layers 104 are adjacent to the liquid crystal layer 105 according to the present invention and directly contact the liquid crystal composition forming the liquid crystal layer 105.

That is, the liquid crystal display device 100 according to the present invention includes, in sequence, the first polarizer 101, the first substrate 102, the electrode layer 103 including the thin-film transistors (also referred to as "thin-film transistor layer"), the alignment layer 104, the layer 105 containing the liquid crystal composition, the alignment layer 104, the common electrode 106, the color filter 107, the second substrate 108, and the first polarizer 109.

As shown in FIG. 2, the electrode layer 103 including the thin-film transistors formed on the first substrate 102 includes gate lines 126 for supplying scan signals and data lines 125 for supplying display signals. The gate lines 126 and the data lines 125 intersect each other. Pixel electrodes 121 are formed in a matrix in the areas surrounded by the gate lines 126 and the data lines 125. The thin-film transistors are disposed near the intersections of the gate lines 126 and the data lines 125 and are coupled to the pixel electrodes 121, serving as switching elements for supplying display signals to the pixel electrodes 121. Each thin-film transistor includes a source electrode 127, a drain electrode 124, and a gate electrode 128. Storage capacitors 123 for storing display signals supplied via the data lines 125 may be disposed in the areas surrounded by the gate lines 126 and the data lines 125.

Substrates

The first substrate 102 and the second substrate 108 may be made of a glass or a flexible transparent material such as a plastic, and one of them may be made of a nontransparent material such as silicon. The two substrates 1102 and 108 are bonded together with a sealant, such as a thermosetting epoxy composition, applied to the periphery thereof. The distance between the two substrates 102 and 108 may be maintained, for example, using spacer particles such as glass, plastic, or alumina particles or resin spacer pillars formed by photolithography.

Thin-Film Transistors

The liquid crystal display device according to the present invention preferably includes inverted-staggered thin-film transistors. As shown in FIG. 3, a preferred example of an inverted-staggered thin-film transistor structure includes a gate electrode 111 formed on the substrate 102, a gate insulating layer 112 covering the gate electrode 111 and substantially the entire surface of the substrate 102, a semiconductor layer 113 formed on the gate insulating layer 12 and opposite the gate electrode 111, a drain electrode 116 covering one end of the semiconductor layer 113 and contacting the gate insulating layer 112 formed on the substrate 102, a source electrode 117 covering the other end of the semiconductor layer 113 and contacting the gate insulating layer 112 formed on the substrate 102, and an insulating protective layer 118 covering the drain electrode 116 and the source electrode 117. An anodized coating (not shown) may be formed on the gate electrode 111, for example, to eliminate the steps formed by the gate electrodes.

As used herein, the phrase "on a substrate" refers to both direct and indirect contact with the substrate and encompasses the situation where an element is supported by the substrate.

The semiconductor layer 113 according to the present invention is made of an oxide semiconductor. The oxide semiconductor preferably contains at least one element selected from In, Ga, Zn, and Sn. To reduce variations in the electrical characteristics of the oxide transistors, the oxide semiconductor may further contain one or more of hafnium (Hf), zirconium (Zr), aluminum (Al), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

Examples of oxide semiconductors include indium oxide, tin oxide, zinc oxide, and gallium oxide. Oxides containing a plurality of metal elements can also be used, including In—Zn-based, Sn—Zn-based, Al—Zn-based, Zn—Mg-based, Sn—Mg-based, In—Mg-based, In—Ga-based, In—Ga—Zn-based, In—Al—Zn-based, In—Sn—Zn-based, Sn—Ga—Zn-based, Al—Ga—Zn-based, Sn—Al—Zn-based, In—Hf—Zn-based, In—Zr—Zn-based, In—La—Zn-based, In—Ce—Zn-based, In—Pr—Zn-based, In—Nd—Zn-based, In—Sm—Zn-based, In—Eu—Zn-based, In—Gd—Zn-based, In—Tb—Zn-based, In—Dy—Zn-based, In—Ho—Zn-based, In—Er—Zn-based, In—Tm—Zn-based, In—Yb—Zn-based, In—Lu—Zn-based, In—Sn—Ga—Zn-based, In—Hf—Ga—Zn-based, In—Al—Ga—Zn-based, In—Sn—Al—Zn-based, In—Sn—Hf—Zn-based, and In—Hf—Al—Zn-based oxides. In—Ga—Zn-based oxides (IGZO), which are oxides containing In, Ga, and Zn, are preferred to reduce the power consumption of the liquid crystal display device and to improve the characteristics such as transmittance of the liquid crystal display device.

For example, the term "In—Ga—Zn-based oxide" refers to an oxide containing In, Ga, and Zn, which may be present in any ratio. Metal elements other than In, Ga, and Zn may also be present.

These are non-limiting examples, and any oxide semiconductor of suitable composition may be used depending on the required semiconductor characteristics (e.g., mobility, threshold, and variations). To achieve the required semiconductor characteristics, it is also preferred to optimize other properties such as carrier density, impurity concentration, defect density, the atomic ratios of metal elements to oxygen, interatomic distance, and density.

The oxide semiconductor layer 113 takes the form of, for example, a monocrystalline, polycrystalline, C-axis aligned crystalline (CAAC), or amorphous film. Preferably, the oxide semiconductor layer 113 is a C-axis aligned crystalline oxide semiconductor (CAAC-OS) film. Some of the oxygen atoms forming the oxide semiconductor film may be replaced with nitrogen.

Oxide semiconductor thin-film transistors allow only a small current to flow in an off state (off current), retain electrical signals such as image signals for a long period of time, and allow a long write cycle to be set in an on state. This provides the advantage of reducing the refresh rate and thus reducing the power consumption. Oxide semiconductor thin-film transistors also have high field-effect mobility, which allows them to operate at high speed. Oxide semiconductor thin-film transistors also have a smaller size than conventional thin-film transistors, which allows more light to pass through each pixel. Thus, the use of oxide semiconductor thin-film transistors in the pixels of the liquid crystal display device provides a high-quality image. It is also preferred to use a transparent oxide semiconductor film, which reduces the influence of photocarriers due to light absorption and thus increases the aperture ratio of the device.

An ohmic contact layer may be disposed between the semiconductor layer 113 and the drain electrode 116 or the source electrode 117 to reduce the width and height of the Schottky barrier. The ohmic contact layer may be made of a material heavily doped with an impurity such as phosphorus, for example, n-type amorphous silicon or n-type polycrystalline silicon.

The gate bus lines 126 and the data bus lines 125 are preferably made of a metal film, more preferably Al, Cu, Au, Ag, Cr, Ta, Ti, Mo, W, Ni, or an alloy thereof, even more preferably Al or an alloy thereof. The gate bus lines 126 and the data bus lines 125 overlap each other with the gate insulating layer therebetween. The insulating protective layer 118, which functions as an insulator, is made of, for example, a silicon nitride, silicon dioxide, or silicon oxynitride film.

Transparent Electrodes

A conductive metal oxide may be used as a transparent electrode material for the pixel electrodes 121 and the transparent electrode (layer) 106 (also referred to as "common electrode 106") of the liquid crystal display device according to the present invention. Examples of metal oxides that can be used include indium oxide ($InzO_3$), tin oxide ($SnO_2$), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbons, and metal nanowires, preferably zinc oxide (ZnO), indium tin oxide ($In_2O_3$—$SnO_2$), and indium zinc oxide ($In_2O_3$—ZnO). These transparent conductive films may be patterned by techniques such as photoetching and mask patterning.

Color Filter

The color filter 107 includes a black matrix and pixel regions of at least three colors including RGB. To reduce the leakage of light, the black matrix (not shown) is preferably formed in the area of the color filter 107 corresponding to the thin-film transistors and the storage capacitors 123.

Alignment Layers

The liquid crystal display device according to the present invention may include alignment layers disposed on the surfaces of the first and second substrates adjacent to the liquid crystal composition to align the liquid crystal composition. If the liquid crystal display device requires an alignment layer, it may be disposed between the color filter and the liquid crystal layer. Even a thick alignment layer has a thickness of only 100 nm or less, which is insufficient to completely reduce the diffusion of oxygen desorbed from the oxide semiconductor layer 113 into the liquid crystal layer 5.

If the liquid crystal display device includes no alignment layer, a larger interaction occurs between the oxide semiconductor layer and the liquid crystal compounds forming the liquid crystal layer.

Examples of alignment layer materials that can be used include transparent organic materials such as polyimides, polyamides, benzocyclobutene (BCB) polymers, and polyvinyl alcohol. Particularly preferred are polyimide alignment layers, which are formed by the imidation of polyamic acids synthesized from diamines such as aliphatic and alicyclic diamines, including p-phenylenediamine and 4,4'-diaminodiphenylmethane, and aliphatic and alicyclic tetracarboxylic anhydrides such as butanetetracarboxylic anhydride and 2,3,5-tricarboxycyclopentylacetic anhydride or aromatic tetracarboxylic anhydrides such as pyromellitic dianhydride. Although a typical alignment process for polyimide alignment layers is rubbing, they may be used without an alignment process, for example, if they are used as vertical alignment layers.

Other alignment layer materials include those containing a chalcone, cinnamate, cinnamoyl, or azo group in the compound. These alignment layer materials may be used in combination with other materials such as polyimides and polyamides. These alignment layers may be subjected to either rubbing or photoalignment.

Although a typical alignment layer is a resin layer formed by applying an alignment layer material to a substrate using a process such as spin coating, other techniques such as uniaxial drawing and the Langmuir-Blodgett technique may also be used.

Liquid Crystal Layer

The liquid crystal layer of the liquid crystal display device according to the present invention contains at least one compound selected from the group consisting of compounds represented by general formulas (LC1) and (LC2).

[Chem. 4]

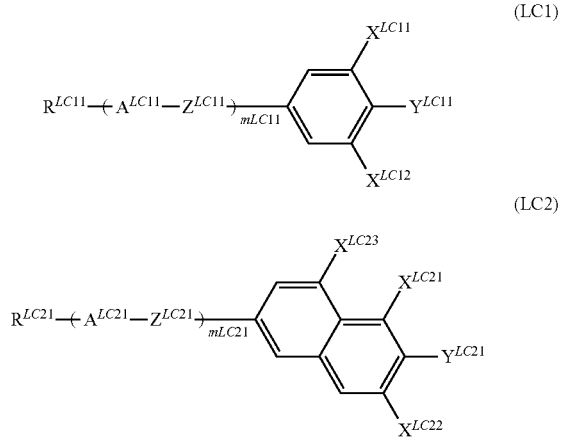

In the formulas, $R^{LC11}$ and $R^{LC21}$ are each independently an alkyl group of 1 to 15 carbon atoms, where one or more —$CH_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen. $A^{LC11}$ and $A^{LC21}$ are each independently any of the following structures.

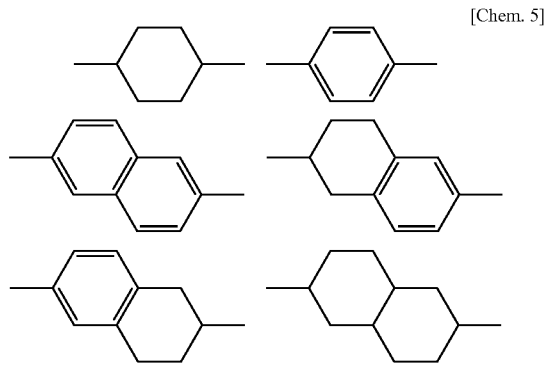

[Chem. 5]

In the structures, one or more —$CH_2$— groups in the cyclohexylene group are optionally replaced with oxygen; one or more —CH— groups in the 1,4-phenylene group are optionally replaced with nitrogen; and one or more hydrogen atoms in the structures are optionally replaced with fluorine, chlorine, —$CF_3$, or —$OCF_3$). $X^{LC11}$, $X^{LC12}$, and $X^{LC21}$ to $X^{LC23}$ are each independently hydrogen, chlorine, fluorine, —$CF_3$, or —$OCF_3$. $Y^{LC11}$ and $Y^{LC21}$ are each independently hydrogen, chlorine, fluorine, cyano, —$CF_3$, —$OCH_2F$, —$OCHF_2$, or —$OCF_3$. $Z^{LC11}$ and $Z^{LC21}$ are each independently a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—. $m^{LC11}$ and $m^{LC21}$ are each independently an integer of 1 to 4. Each occurrence of $A^{LC11}$, $A^{LC21}$, $Z^{LC11}$, and $Z^{LC11}$, if present, may be the same or different.

In general formulas (LC1) and (LC2), $R^{LC11}$ to $R^{LC21}$ are preferably each independently an alkyl group of 1 to 7 carbon atoms, an alkoxy group of 1 to 7 carbon atoms, or an alkenyl group of 2 to 7 carbon atoms, more preferably an alkyl group of 1 to 5 carbon atoms, an alkoxy group of 1 to 5 carbon atoms, or an alkenyl group of 2 to 5 carbon atoms, even more preferably linear. Most preferred are alkenyl groups having the following structures.

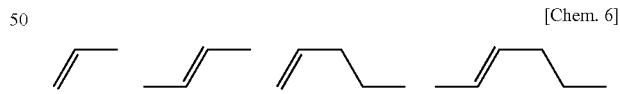

[Chem. 6]

In the formulas, the right end is linked to the cyclic structure.

$A^{LC11}$ and $A^{LC21}$ are preferably each independently any of the following structures.

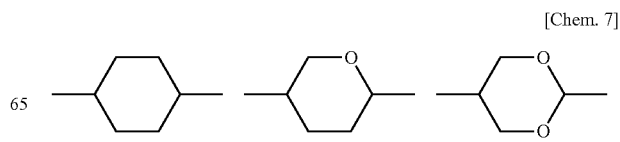

[Chem. 7]

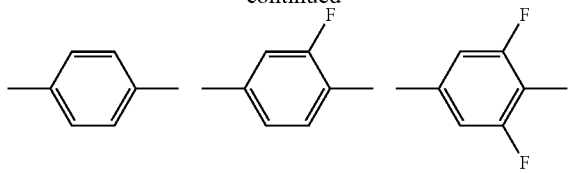

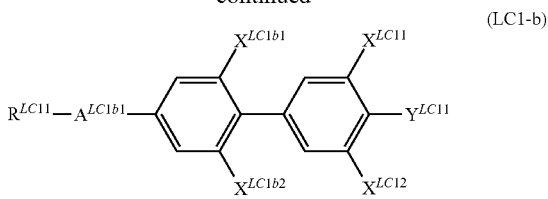

$Y^{LC11}$ and $Y^{LC21}$ are preferably each independently fluorine, cyano, —$CF_3$, or —$OCF_3$, more preferably fluorine or —$OCF_3$, even more preferably F.

$Z^{LC11}$ and $Z^{LC21}$ are each preferably a single bond, —$CH_2CH_2$—, —COO—, —OCO—, —$OCH_2$—, —$CH_2O$—, —$OCF_2$—, or —$CF_2O$—, more preferably a single bond, —$CH_2CH_2$—, —$OCH_2$—, —$OCF_2$—, or —$CF_2O$—, even more preferably a single bond, —$OCH_2$—, or —$CF_2O$—.

$m^{LC11}$ and $m^{LC21}$ are each preferably 1, 2, or 3. If it is desirable to achieve a higher storage stability at low temperature and a faster response time, $m^{LC11}$ and $m^{LC21}$ are each preferably 1 or 2. If it is desirable to achieve a higher upper nematic phase temperature limit, $m^{LC11}$ and $m^{LC21}$ are each preferably 2 or 3.

The liquid crystal layer preferably contains, as the compounds represented by general formula (LC1), at least one compound selected from the group consisting of compounds represented by general formulas (LC1-a) to (LC1-c) below.

[Chem. 8]

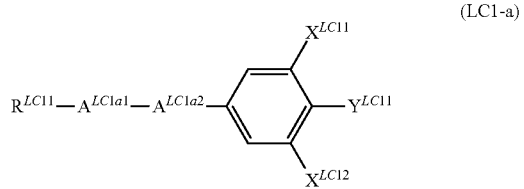

In the formulas, $R^{LC11}$, $Y^{LC11}$, $X^{LC11}$, and $X^{LC12}$ are each independently as defined for $R^{LC11}$, $Y^{LC11}$, $X^{LC11}$, and $X^{LC12}$, respectively, in general formula (LC1); $A^{LC1a1}$, $A^{LC1a2}$, and $A^{LC1b1}$ are each trans-1,4-cyclohexylene, tetrahydropyran-2,5-diyl, or 1,3-dioxane-2,5-diyl; and $X^{LC1b1}$, $X^{LC1b2}$, and $X^{LC1c1}$ to $X^{LC1c4}$ are each independently hydrogen, chlorine, fluorine, —$CF_3$, or —$OCF_3$.

$X^{LC11}$ to $X^{LC1c4}$ are preferably each independently hydrogen or fluorine.

$Y^{LC11}$ are preferably each independently fluorine, —$CF_3$, or —$OCF_3$.

Also preferably, the liquid crystal layer contains, as the compounds represented by general formula (LC1), at least one compound selected from the group consisting of compounds represented by general formulas (LC1-d) to (LC1-m) below.

[Chem. 9]

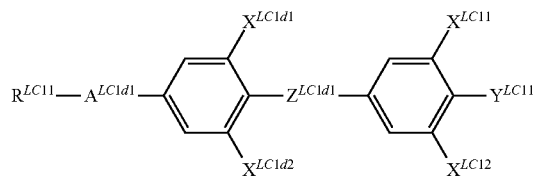

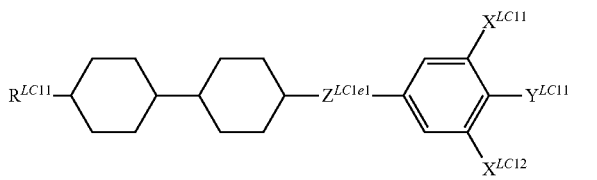

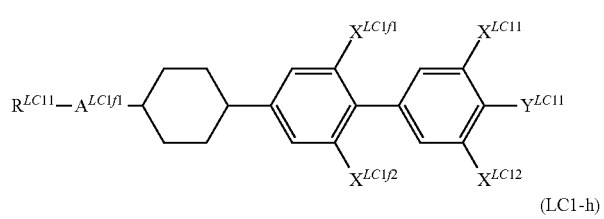

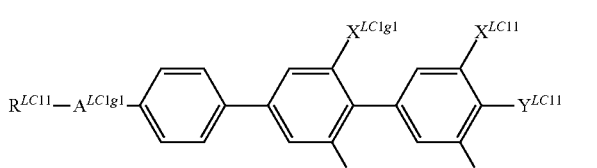

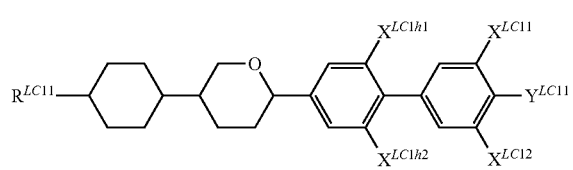

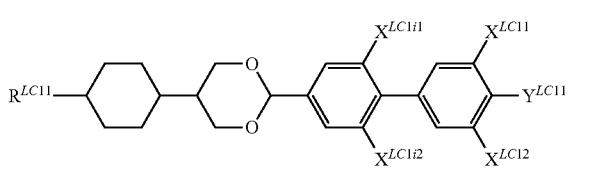

-continued

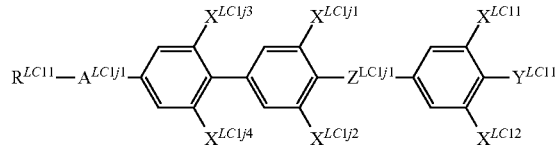
(LC1-j)

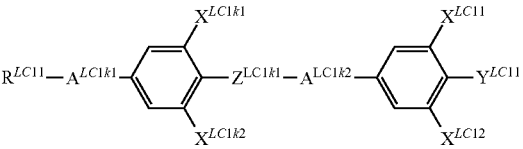
(LC1-k)

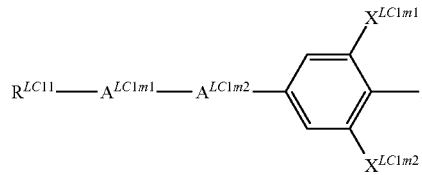
(LC1-m)

In the formulas, $R^{LC11}$, $Y^{LC11}$, $X^{LC11}$, and $X^{LC12}$ are each independently as defined for $R^{LC11}$, $Y^{LC11}$, $X^{LC11}$, and $X^{LC12}$, respectively, in general formula (LC1); $A^{LC1d1}$, $A^{LC1f1}$, $A^{LC1g1}$, $A^{LC1j1}$, $A^{LC1k1}$, $A^{LC1k2}$, and $A^{LC1m1}$ to $A^{LC1m3}$ are each 1,4-phenylene, trans-1,4-cyclohexylene, tetrahydropyran-2,5-diyl, or 1,3-dioxane-2,5-diyl; $X^{LC1d1}$, $X^{LC1d2}$, $X^{LC1f1}$, $X^{LC1f2}$, $X^{LC1g1}$, $X^{LC1g2}$, $X^{LC1h1}$, $X^{LC1h2}$, $X^{LC1i1}$, $X^{LC1i2}$, $X^{LC1j1}$ to $X^{LC1j4}$, $X^{LC1k1}$, $X^{LC1k2}$, $X^{LC1m1}$, and $X^{LC1m2}$ are each independently hydrogen, chlorine, fluorine, —$CF_3$, or —$OCF_3$; and $Z^{LC1d1}$, $Z^{LC1e1}$, $Z^{LC1j1}$, $Z^{LC1k1}$, and $Z^{LC1m1}$ are each independently a single bond, —CH=CH—, —CF=CF—, —C≡C—, —$CH_2$CH—, —$(CH_2)_4$—, —$OCH_2$—, —$CH_2$O—, —$OCF_2$—, —$CF_2$O—, —COO—, or —OCO—.

$X^{LC11}$ to $X^{LC1m2}$ are preferably each independently hydrogen or fluorine.

$Y^{LC11}$ is preferably each independently fluorine, —$CF_3$, or —$OCF_3$.

$Z^{LC1d1}$ to $Z^{LC1m1}$ are preferably each independently —$CF_2$O— or —$OCH_2$—.

The liquid crystal layer preferably contains, as the compounds represented by general formula (LC2), at least one compound selected from the group consisting of compounds represented by general formulas (LC2-a) to (LC2-g) below.

[Chem. 10]

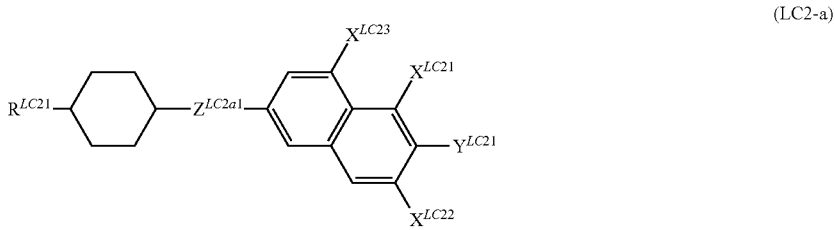
(LC2-a)

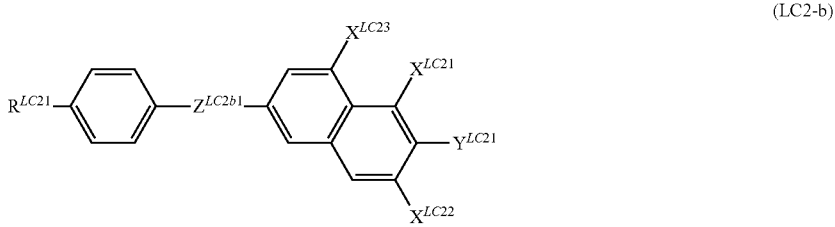
(LC2-b)

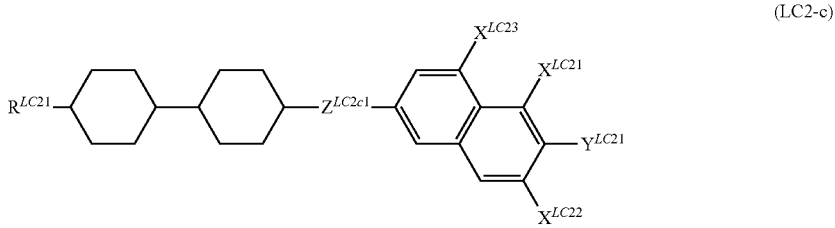
(LC2-c)

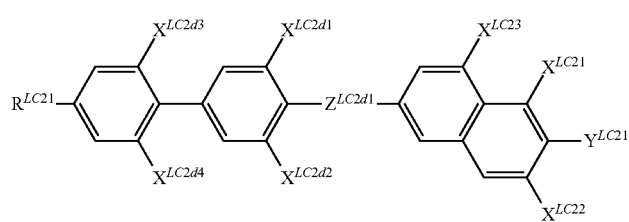

(LC2-d)

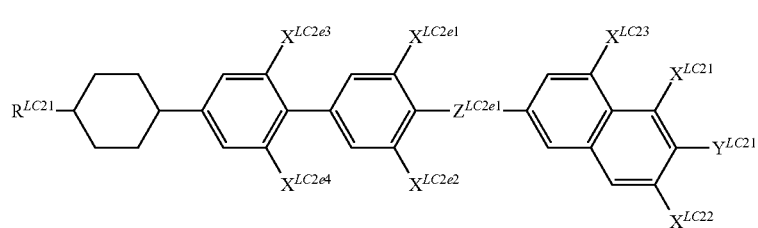

(LC2-e)

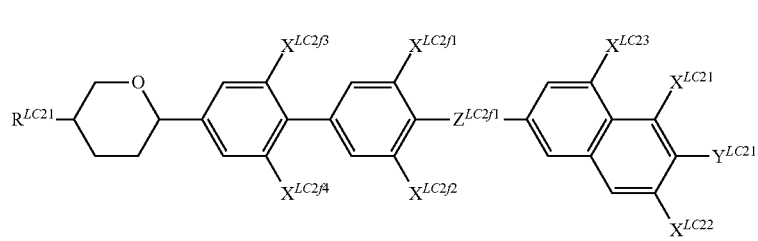

(LC2-f)

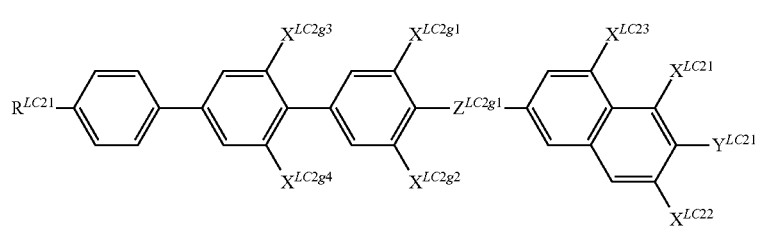

(LC2-g)

In the formulas, $R^{LC21}$, $Y^{LC21}$, and $X^{LC21}$ to $X^{LC23}$ are each independently as defined for $R^{LC21}$, $Y^{LC21}$, and $X^{LC21}$ to $X^{LC23}$, respectively, in general formula (LC2); $X^{LC2d1}$ to $X^{LC2d4}$, $X^{LC2e1}$ to $X^{LC2e4}$, $X^{LC2f1}$ to $X^{LC2f4}$, and $X^{LC2g1}$ to $X^{LC2g4}$ are each independently hydrogen, chlorine, fluorine, —$CF_3$, or —$OCF_3$; and $Z^{LC2a1}$, $Z^{LC2b1}$, $Z^{LC2c1}$, $Z^{LC2d1}$, $Z^{LC2e1}$, $Z^{LC2f1}$, and $Z^{LC2g1}$ are each independently a single bond, —CH═CH—, —CF═CF—, —C≡C—, —$CH_2CH_2$—, —$(CH_2)_4$—, —$OCH_2$—, —$CH_2O$—, —$OCF_2$—, —$CF_2O$—, —COO—, or —OCO—.

$X^{LC21}$ to $X^{LC2g4}$ are preferably each independently hydrogen or fluorine.

$Y^{LC21}$ is preferably each independently fluorine, —$CF_3$, or —$OCF_3$.

$Z^{LC2a1}$ to $Z^{LC2g4}$ are preferably each independently —$CF_2O$— or —$OCH_2$—.

Also preferably, the liquid crystal layer contains, as the compounds represented by general formulas (LC1) and (LC2), at least one compound selected from the group consisting of compounds represented by general formula (LC-I).

[Chem. 11]

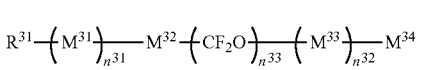

(LC-I)

In the formulas, $R^{31}$ is an alkyl group of 1 to 10 carbon atoms, an alkoxy group of 1 to 10 carbon atoms, an alkenyl group of 2 to 10 carbon atoms, or an alkenyloxy group of 2 to 10 carbon atoms;

$M^{31}$ to $M^{33}$ are each independently trans-1,4-cyclohexylene, 1,4-phenylene, or naphthalene-2,6-dienyl, where one or more non-adjacent —$CH_2$— groups in the trans-1,4-cyclohexylene group are optionally replaced with —O— such that no oxygen atoms are directly adjacent to each other, one or more non-adjacent —CH═ groups in the phenylene group are optionally replaced with —N═, any hydrogen atom present in the group is optionally replaced with fluorine, and any hydrogen atom present in the naphthalene-2,6-dienyl group is optionally replaced with fluorine; and $M^{34}$ is represented by any of the following formulas.

[Chem. 12]

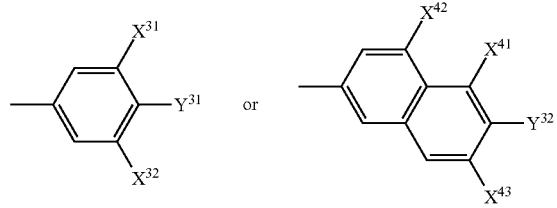

In the formulas, $X^{31}$, $X^{32}$, $X^{41}$, $X^{42}$, and $X^{43}$ are each independently hydrogen or fluorine, and $Y^{31}$ and $Y^{32}$ are each fluorine, chlorine, cyano, $-CF_3$, $-OCH_2F$, $-OCHF_2$, or $-OCF_3$).

$n^{31}$ and $n^{31}$ are each independently 0, 1, or 2, with the proviso that $n^{31}+n^{32}$ is 0, 1, or 2, where each occurrence of $M^{31}$ and $M^{33}$, if present, may be the same or different. $n^{33}$ is 0 or 1.

If $R^{31}$ in general formula (LC-I) is linked to phenyl (aromatic group), it is preferably a linear alkyl group of 1 to 5 carbon atoms, a linear alkoxy group of 1 to 4 (or more) carbon atoms, or an alkenyl group of 4 or 5 carbon atoms. If $R^{31}$ is linked to a saturated cyclic structure such as cyclohexane, pyran, or dioxane, it is preferably a linear alkyl group of 1 to 5 carbon atoms, a linear alkoxy group of 1 to 4 (or more) carbon atoms, or a linear alkenyl group of 2 to 5 carbon atoms.

If it is desirable to achieve good chemical stability to heat and light, $R^{31}$ is preferably alkyl. If it is desirable to produce a liquid crystal display device with low viscosity and fast response time, $R^{31}$ is preferably alkenyl. If it is desirable to achieve a low viscosity, a high nematic-isotropic phase transition temperature (Tni), and a faster response time, it is preferred to use an alkenyl group having no unsaturated bond at the end thereof, more preferably an alkenyl group having methyl at the end thereof. If it is desirable to achieve good solubility at low temperature, $R^{31}$ is preferably alkoxy. Alternatively, it is preferred to use a combination of compounds having different groups at $R^{31}$. For example, it is preferred to use a combination of compounds having alkyl or alkenyl groups of 2, 3, and 4 carbon atoms at $R^3$, a combination of compounds having alkyl or alkenyl groups of 3 and 5 carbon atoms at $R^3$, or a combination of compounds having alkyl or alkenyl groups of 3, 4, and 5 carbon atoms at $R^{31}$.

$M^{31}$ to $M^{33}$ are each preferably any of the following structures.

[Chem. 13]

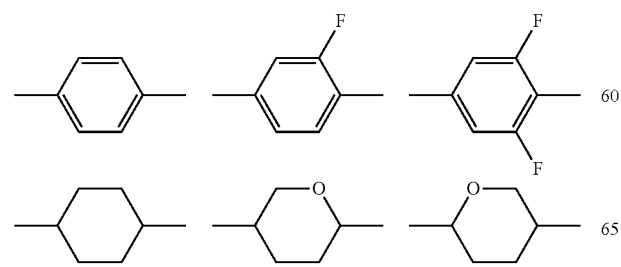

-continued

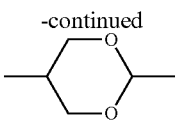

[Chem. 14]

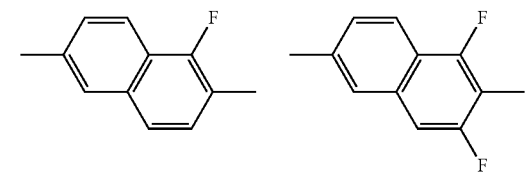

$M^{31}$ is preferably any of the following structures.

[Chem. 15]

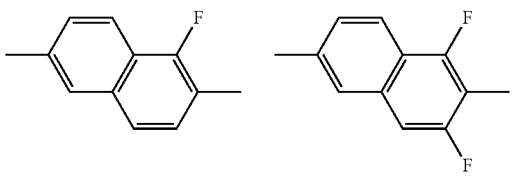

More preferably, $M^{31}$ is any of the following structures.

[Chem. 16]

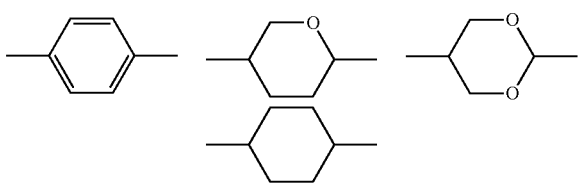

$M^{31}$ is preferably any of the following structures.

[Chem. 17]

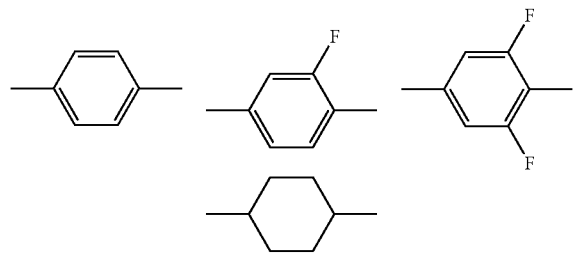

More preferably, $M^{32}$ is any of the following structures.

[Chem. 18]

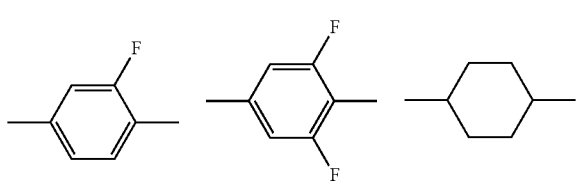

Even more preferably, $M^{31}$ is any of the following structures.

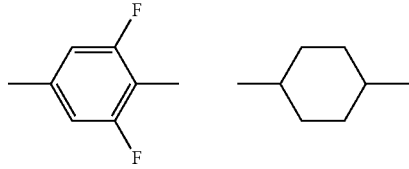
[Chem. 19]

$M^{33}$ is preferably any of the following structures.

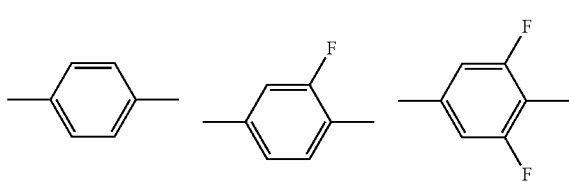
[Chem. 20]

More preferably, $M^{33}$ is any of the following structures.

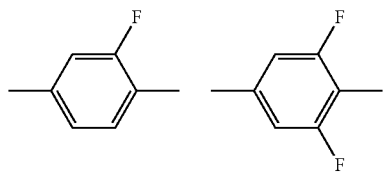
[Chem. 21]

Even more preferably, $M^{33}$ is the following structure.

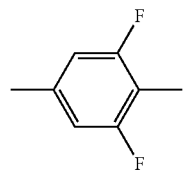
[Chem. 22]

To achieve a lower viscosity, $M^{34}$ is preferably the following structure.

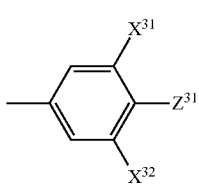
[Chem. 23]

To achieve a higher $\Delta\varepsilon$, $M^{34}$ is preferably the following structure.

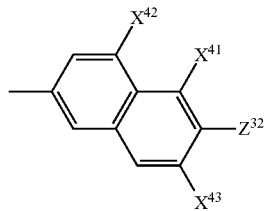
[Chem. 24]

$X^{31}$, $X^{32}$, $X^{33}$, $X^{34}$, and $X^{35}$ are preferably each independently hydrogen to achieve a lower viscosity or fluorine to achieve a higher $\Delta\varepsilon$. To achieve a higher $\Delta\varepsilon$, therefore, at least one of $X^{31}$ and $X^{32}$ is preferably fluorine, and more preferably, both are fluorine. If $X^{41}$ to $X^{43}$ are each independently fluorine or hydrogen, it is preferred that $X^{41}$ be fluorine and $X^{42}$ and $X^{43}$ be hydrogen if it is desirable to achieve a lower viscosity and a better miscibility with other liquid crystal components, and it is preferred that $X^{41}$ and $X^{42}$ be fluorine and $X^{43}$ be fluorine or hydrogen if it is desirable to achieve a higher $\Delta\varepsilon$.

$Z^{31}$ and $Z^{32}$ are each preferably fluorine or trifluoromethoxy.

In one embodiment, the combination of $X^{31}$, $X^3$, and $Z^{31}$ is $X^{31}$=F, $X^{32}$=F, and $Z^{31}$=F. In another embodiment, the combination of $X^{31}$, $X^{32}$, and $Z^{31}$ is $X^{31}$=F, $X^{32}$=H, and $Z^{31}$=F. In yet another embodiment, the combination of $X^{31}$, $X^3$, and $Z^{31}$ is $X^{31}$=F, $X^{32}$=H, and $Z^{31}$=OCF$_3$. In still yet another embodiment, the combination of $X^{31}$, $X^{32}$, and $Z^{31}$ is $X^{31}$=F, $X^{32}$=F, and $Z^{31}$=OCF$_3$. In a further embodiment, the combination of $X^3$, $X^{32}$, and $Z^{31}$ is $X^{31}$=H, $X^{32}$=H, and $Z^{31}$=OCF$_3$.

$n^{31}$ is preferably 1 or 2. $n^{32}$ is preferably 0 or 1, more preferably 0. $n^{31}$+$n^{32}$ is preferably 1 or 2, more preferably 2. $n^{33}$ is preferably 1.

Specific preferred compounds represented by general formula (LC-I) include those represented by general formulas (I-a) to (I-f) below.

[Chem. 25]

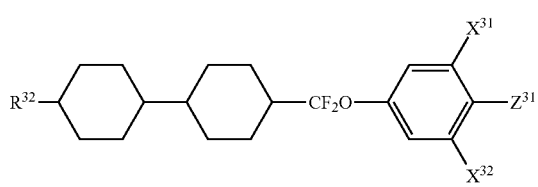
(I-a)

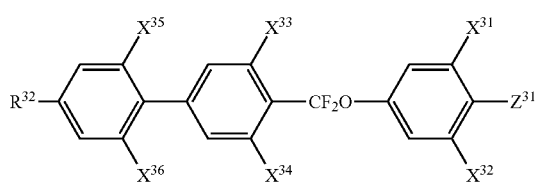
(I-b)

(I-c)

-continued

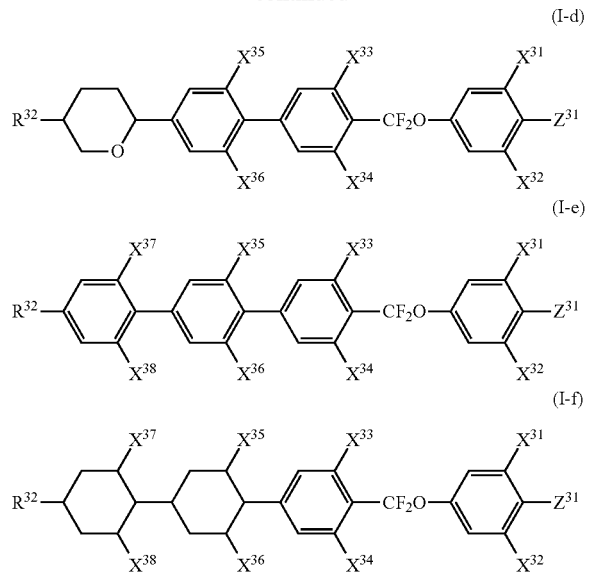

(I-d)

(I-e)

(I-f)

In the formulas, $R^{31}$ is an alkyl group of 1 to 10 carbon atoms, an alkoxy group of 1 to 10 carbon atoms, an alkenyl group of 2 to 10 carbon atoms, or an alkenyloxy group of 2 to 10 carbon atoms; $X^3$ to $X^{33}$ are each independently hydrogen or fluorine; and $Z^{31}$ is fluorine, trifluoromethoxy, or trifluoromethyl.

If $R^{32}$ in general formulas (Ia) to (If) is linked to phenyl (aromatic group), it is preferably a linear alkyl group of 1 to 5 carbon atoms, a linear alkoxy group of 1 to 4 (or more) carbon atoms, or an alkenyl group of 4 or 5 carbon atoms. If $R^{32}$ is linked to a saturated cyclic structure such as cyclohexane, pyran, or dioxane, it is preferably a linear alkyl group of 1 to 5 carbon atoms, a linear alkoxy group of 1 to 4 (or more) carbon atoms, or a linear alkenyl group of 2 to 5 carbon atoms.

If it is desirable to achieve good chemical stability to heat and light, $R^{31}$ is preferably alkyl. If it is desirable to produce a liquid crystal display device with low viscosity and fast response time, $R^{31}$ is preferably alkenyl. If it is desirable to achieve a low viscosity, a high nematic-isotropic phase transition temperature (Tni), and a faster response time, it is preferred to use an alkenyl group having no unsaturated bond at the end thereof, more preferably an alkenyl group having methyl at the end thereof. If it is desirable to achieve good solubility at low temperature, $R^{31}$ is preferably alkoxy. Alternatively, it is preferred to use a combination of compounds having different groups at $R^{31}$. For example, it is preferred to use a combination of compounds having alkyl or alkenyl groups of 2, 3, and 4 carbon atoms at $R^{31}$, a combination of compounds having alkyl or alkenyl groups of 3 and 5 carbon atoms at $R^{31}$, or a combination of compounds having alkyl or alkenyl groups of 3, 4, and 5 carbon atoms at $R^{31}$.

At least one of $X^{35}$ and $X^{3E}$ is preferably fluorine. Although compounds where both $X^{35}$ and $X^{36}$ are fluorine are effective in achieving a higher Δε, they are not preferred for reasons of Tni, solubility at low temperature, and the chemical stability of the resulting liquid crystal display device.

At least one of $X^{37}$ and $X^{38}$ is preferably hydrogen, and more preferably, both are hydrogen. Compounds where at least one of $X^{37}$ and $X^{38}$ is fluorine are not preferred for reasons of Tni, solubility at low temperature, and the chemical stability of the resulting liquid crystal display device.

The liquid crystal layer preferably contains one to eight, more preferably one to five, compounds selected from the group consisting of compounds represented by general formula (LC-1). These compounds are preferably present in an amount of 3% to 50% by mass, more preferably 5% to 40% by mass.

The liquid crystal layer of the liquid crystal display device according to the present invention further contains at least one compound selected from the group consisting of compounds represented by general formulas (II-a) to (II-f).

[Chem. 26]

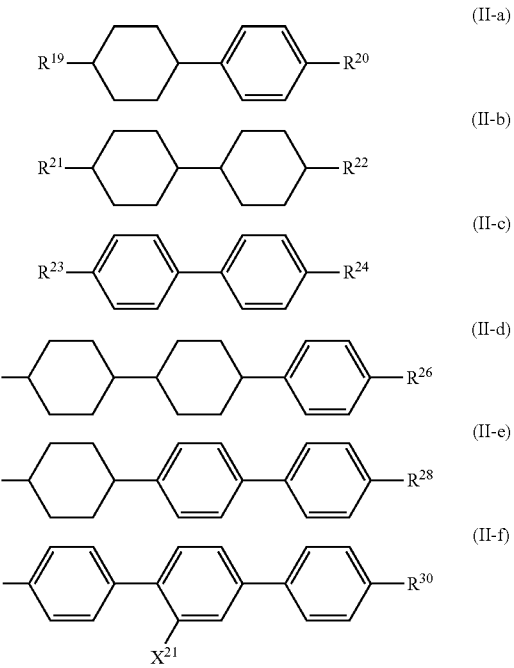

(II-a)

(II-b)

(II-c)

(II-d)

(II-e)

(II-f)

In the formulas, $R^{19}$ to $R^{30}$ are each independently an alkyl group of 1 to 10 carbon atoms, an alkoxy group of 1 to 10 carbon atoms, or an alkenyl group of 2 to 10 carbon atoms; and $X^{21}$ is hydrogen or fluorine.

If $R^{19}$ to $R^{30}$ in general formulas (IIa) to (IIf) are linked to phenyl (aromatic group), they are each preferably a linear alkyl group of 1 to 5 carbon atoms, a linear alkoxy group of 1 to 4 (or more) carbon atoms, or an alkenyl group of 4 or 5 carbon atoms. If $R^{19}$ to $R^{30}$ are linked to a saturated cyclic structure such as cyclohexane, pyran, or dioxane, they are each preferably a linear alkyl group of 1 to 5 carbon atoms, a linear alkoxy group of 1 to 4 (or more) carbon atoms, or a linear alkenyl group of 2 to 5 carbon atoms.

If it is desirable to achieve good chemical stability to heat and light, $R^{19}$ to $R^{30}$ are preferably alkyl. If it is desirable to produce a liquid crystal display device with low viscosity and fast response time, $R^{19}$ to $R^{30}$ are preferably alkenyl. If it is desirable to achieve a low viscosity, a high nematic-isotropic phase transition temperature (Tni), and a faster response time, it is preferred to use an alkenyl group having no unsaturated bond at the end thereof, more preferably an alkenyl group having methyl at the end thereof. If it is desirable to achieve good solubility at low temperature, $R^{19}$ to $R^{30}$ are preferably alkoxy. Alternatively, it is preferred to use a combination of compounds having different groups at $R^{19}$ to $R^{30}$. For example, it is preferred to use a combination of compounds having alkyl or alkenyl groups of 2, 3, and 4 carbon atoms at $R^{19}$ to $R^{36}$, a combination of compounds having alkyl or alkenyl groups of 3 and 5 carbon atoms at $R^{19}$ to $R^{31}$, or a combination of compounds having alkyl or alkenyl groups of 3, 4, and 5 carbon atoms at $R^{19}$ to $R^{30}$.

$R^{19}$ and $R^{20}$ are each preferably alkyl or alkoxy, and at least one of them is preferably alkoxy. More preferably, $R^{19}$ is alkyl, and $R^{20}$ is alkoxy. Even more preferably, $R^{19}$ is an alkyl group of 3 to 5 carbon atoms, and $R^{20}$ is an alkoxy group of 1 or 2 carbon atoms.

$R^{21}$ and $R^{72}$ are each preferably alkyl or alkenyl, and at least one of them is preferably alkenyl. Although compounds where both $R^{21}$ and $R^{22}$ are alkenyl are preferred to achieve a faster response time, they are not preferred to improve the chemical stability of the liquid crystal display device.

At least one of $R^{23}$ and $R^{24}$ is preferably an alkyl group of 1 to 5 carbon atoms, an alkoxy group of 1 to 5 carbon atoms, or an alkenyl group of 4 or 5 carbon atoms. If it is desirable to achieve a good balance of response time and $T_{ni}$, at least one of $R^{23}$ and $R^{24}$ is preferably alkenyl. If it is desirable to achieve a good balance of response time and solubility at low temperature, at least one of $R^{23}$ and $R^{24}$ is preferably alkoxy.

At least one of $R^{25}$ and $R^{26}$ is preferably an alkyl group of 1 to 5 carbon atoms, an alkoxy group of 1 to 5 carbon atoms, or an alkenyl group of 2 to 5 carbon atoms. If it is desirable to achieve a good balance of response time and Tni, at least one of $R^{25}$ and $R^{26}$ is preferably alkenyl. If it is desirable to achieve a good balance of response time and solubility at low temperature, at least one of $R^{25}$ and $R^{26}$ is preferably alkoxy. More preferably, $R^{25}$ is alkenyl, and $R^{26}$ is alkyl. Also preferably, $R^{25}$ is alkyl, and $R^{26}$ is alkoxy.

At least one of $R^{27}$ and $R^{28}$ is preferably an alkyl group of 1 to 5 carbon atoms, an alkoxy group of 1 to 5 carbon atoms, or an alkenyl group of 2 to 5 carbon atoms. If it is desirable to achieve a good balance of response time and Tni, at least one of $R^{27}$ and $R^{28}$ is preferably alkenyl. If it is desirable to achieve a good balance of response time and solubility at low temperature, at least one of $R^{27}$ and $R^{28}$ is preferably alkoxy. More preferably, $R^{27}$ is alkyl or alkenyl, and $R^{28}$ is alkyl. Also preferably, $R^{27}$ is alkyl, and $R^{28}$ is alkoxy. Even more preferably, $R^{27}$ is alkyl, and $R^{28}$ is alkyl.

$X^{21}$ is preferably fluorine.

At least one of $R^{29}$ and $R^{30}$ is preferably an alkyl group of 1 to 5 carbon atoms or an alkenyl group of 4 or 5 carbon atoms. If it is desirable to achieve a good balance of response time and Tni, at least one of $R^{29}$ and $R^{30}$ is preferably alkenyl. If it is desirable to achieve good reliability, at least one of $R^{29}$ and $R^{30}$ is preferably alkyl. More preferably, $R^{29}$ is alkyl or alkenyl, and $R^{30}$ is alkyl or alkenyl. Also preferably, $R^{29}$ is alkyl, and $R^{31}$ is alkenyl. Also preferably, $R^{29}$ is alkyl, and $R^{30}$ is alkyl.

The liquid crystal layer preferably contains one to ten, more preferably one to eight, compounds selected from the group consisting of compounds represented by general formulas (II-a) to (II-f). These compounds are preferably present in an amount of 5% to 80% by mass, more preferably 10% to 70% by mass, even more preferably 20% to 60% by mass.

The liquid crystal layer of the liquid crystal display device according to the present invention preferably further contains a compound represented by general formula (LC).

[Chem. 27]

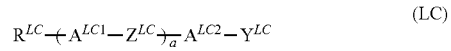

(LC)

In general formula (LC), $R^{LC}$ is an alkyl group of 1 to 15 carbon atoms, where one or more —$CH_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen;

$A^{LC1}$ and $A^{LC2}$ are each independently a group selected from the group consisting of (a) trans-1,4-cyclohexylene (where one or more non-adjacent —$CH_2$— groups present in the group are optionally replaced with oxygen or sulfur), (b) 1,4-phenylene (where one or more non-adjacent —CH— groups present in the group are optionally replaced with nitrogen), and (c) 1,4-bicyclo(2.2.2)octylene, naphthalene-2,6-diyl, decahydronaphthalene-2,6-diyl, 1,2,3,4-tetrahydronaphthalene-2,6-diyl, and chromane-2,6-diyl, where one or more hydrogen atoms present in groups (a), (b), and (c) are each optionally replaced with fluorine, chlorine, —$CF_3$, or —$OCF_3$;

$Z^{LC}$ is a single bond, —CH=CH—, —CF=CF—, —C≡C—, —$CH_2CH_2$—, —$(CH_2)_4$—, —$OCH_2$—, —$CH_2O$—, —$OCF_2$—, —$CF_2O$—, —COO—, or —OCO—;

$Y^{LC}$ is hydrogen, fluorine, chlorine, cyano, or an alkyl group of 1 to 15 carbon atoms, where one or more —$CH_2$— groups in the alkyl group are optionally replaced with —O—, —CH=CH—, —CO—, —OCO—, —COO—, —C≡C—, —CFO—, or —$OCF_2$— such that no oxygen atoms are directly adjacent to each other, and one or more hydrogen atoms in the alkyl group are optionally replaced with halogen; and a is an integer of 1 to 4, where if a is 2, 3, or 4, each occurrence of $A^{LC1}$ may be the same or different, and each occurrence of $Z^{LC}$ may be the same or different, with the proviso that compounds represented by general formulas (LC1), (LC2), and (II-a) to (II-f) are excluded.

The liquid crystal layer preferably contains one to ten, more preferably one to eight, compounds selected from the group consisting of compounds represented by general formula (LC). These compounds are preferably present in an amount of 5% to 50% by mass, more preferably 10% to 40% by mass.

To achieve a faster response time, the liquid crystal composition preferably contains, as the compound represented by general formula (LC), at least one compound represented by general formula (LC6) below.

[Chem. 28]

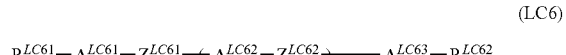

(LC6)

In the formula, $R^{LC61}$ and $R^{LC62}$ are each independently an alkyl group of 1 to 15 carbon atoms, where one or more —$CH_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen. $A^{LC61}$ to $A^{LC63}$ are each independently any of the following structures.

[Chem. 29]

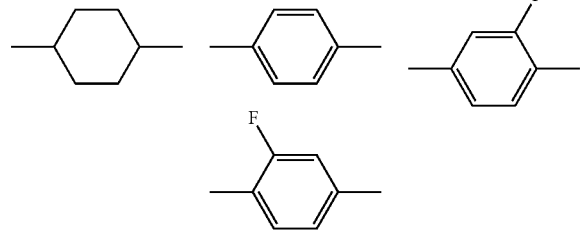

In the structures, one or more —CH$_2$— groups in the cyclohexylene group are optionally replaced with —CH=CH—, —CF$_2$O—, or —OCF$_2$—, and one or more CH groups in the 1,4-phenylene group are optionally replaced with nitrogen. $Z^{LC61}$ and $Z^{LC62}$ are each independently a single bond, —CH=CH—, —C≡C—, —CH$_2$CH$_2$—, —(CH$_2$)$_4$—, —COO—, —OCH$_2$—, —CH$_2$O—, —OCF$_2$—, or —CF$_2$O—. $m^{iii1}$ is 0 to 3. Compounds represented by general formula (I) are excluded.

$R^{LC61}$ and $R^{LC62}$ are preferably each independently an alkyl group of 1 to 7 carbon atoms, an alkoxy group of 1 to 7 carbon atoms, or an alkenyl group of 2 to 7 carbon atoms. Most preferred are alkenyl groups having the following structures.

[Chem. 30]

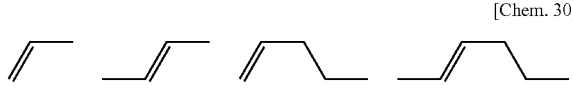

In the formulas, the right end is linked to the cyclic structure.

$A^{LC61}$ to $A^{LC63}$ are preferably each independently any of the following structures.

[Chem. 31]

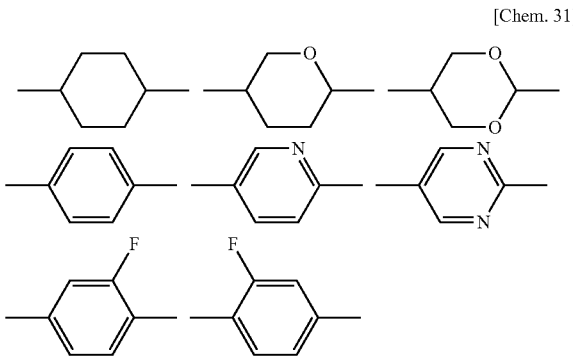

$Z^{LC61}$ and $Z^{LC63}$ are preferably each independently a single bond, —CH$_2$CH$_2$—, —COO—, —OCH$_2$—, —CH$_2$O—, —OCF$_2$—, or —CF$_2$O—.

More preferably, the liquid crystal layer contains, as the compound represented by general formula (LC6), at least one compound selected from the group consisting of compounds represented by general formulas (LC6-a) to (LC6-g).

[Chem. 32]

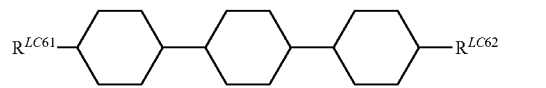
(LC6-a)

(LC6-b)

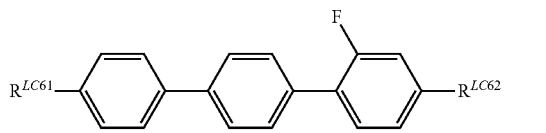

(LC6-c)

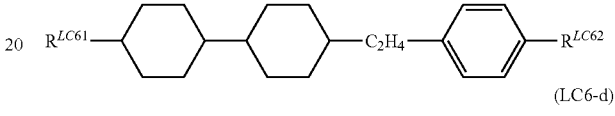

(LC6-d)

(LC6-e)

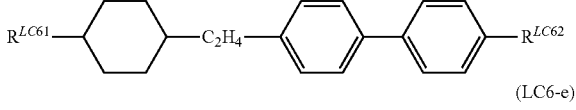

(LC6-f)

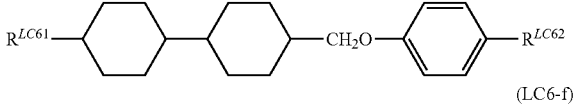

(LC6-g)

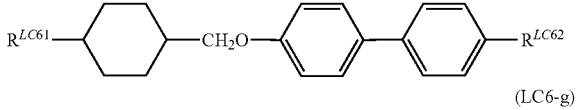

In the formulas, $R^{LC61}$ and $R^{LC62}$ are each independently an alkyl group of 1 to 7 carbon atoms, an alkoxy group of 1 to 7 carbon atoms, an alkenyl group of 2 to 7 carbon atoms, or an alkenyloxy group of 2 to 7 carbon atoms.

The liquid crystal composition used for the liquid crystal composition layer of the liquid crystal display device according to the present invention preferably has a Δε at 25° C. of +1.5 or more. To achieve a faster response time, the liquid crystal composition preferably has a Δε at 25° C. of +1.5 to +4.0, more preferably +1.5 to +3.0. To achieve low-voltage driving, the liquid crystal composition preferably has a Δε at 25° C. of +8.0 to +18.0, more preferably +10.0 to +15.0. The liquid crystal composition preferably has a Δn at 25° C. of 0.08 to 0.14, more preferably 0.09 to 0.13. Specifically, the liquid crystal composition preferably has a Δn at 25° C. of 0.10 to 0.13 for small cell gaps and 0.08 to 0.10 for large cell gaps. The liquid crystal composition preferably has a η at 20° C. of 5 to 45 mPa·s, more preferably 5 to 25 mPa·s, even more preferably 10 to 20 mPa·s. The liquid crystal composition preferably has a $T_{ni}$ of 60° C. to 120° C., more preferably 70° C. to 100° C., even more preferably 70° C. to 85° C.

In addition to the compounds discussed above, the liquid crystal composition according to the present invention may contain other ingredients such as common nematic, smectic, and cholesteric liquid crystals.

The liquid crystal composition according to the present invention may contain at least one polymerizable monomer for the fabrication of liquid crystal display devices such as PS, transverse-field PSA, and transverse-field PSVA liquid crystal display devices.

The liquid crystal layer may contain, as a polymerizable monomer, a polymerizable compound containing one reactive group, i.e., a monofunctional polymerizable compound, or a polymerizable compound containing two or more reactive groups, i.e., a polyfunctional polymerizable compound, such as a di- or trifunctional polymerizable compound. The reactive-group-containing polymerizable compounds may or may not contain a mesogenic moiety.

The reactive-group-containing polymerizable compounds preferably contain a photopolymerizable substituent, particularly if vertical alignment layers are formed by thermal polymerization. This reduces the reaction of the reactive-group-containing polymerizable compounds during the thermal polymerization of the vertical alignment layer material.

Among reactive-group-containing polymerizable compounds, specific preferred monofunctional reactive-group-containing polymerizable compounds include polymerizable compounds represented by general formula (VI) below.

[Chem. 33]

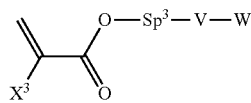

(VI)

In the formula, $X^3$ is hydrogen or methyl; $Sp^3$ is a single bond, an alkylene group of 1 to 8 carbon atoms, or —O—$(CH_2)_t$— (where t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other and is optionally substituted with an alkyl group of 5 to 20 carbon atoms (where the alkylene group in the group is optionally substituted with oxygen such that no oxygen atoms are adjacent to each other) or a cyclic substituent; and W is hydrogen, halogen, or an alkylene group of 1 to 8 carbon atoms.

Although $X^3$ in general formula (VI) above is hydrogen or methyl, $X^3$ is preferably hydrogen if it is desirable to achieve a higher reaction rate and is preferably methyl if it is desirable to achieve a lower residual monomer content.

Although $Sp^3$ in general formula (VI) above is a single bond, an alkylene group of 1 to 8 carbon atoms, or —O—$(CH_2)_t$— (where t is an integer of 2 to 7, and the oxygen atom is linked to the aromatic ring), shorter carbon chains are preferred. Specifically, $Sp^3$ is preferably a single bond or an alkylene group of 1 to 5 carbon atoms, more preferably a single bond or an alkylene group of 1 to 3 carbon atoms. If $Sp^3$ is —O—$(CH_2)_t$—, t is preferably 1 to 5, more preferably 1 to 3.

Although V in general formula (VI) above is a linear or branched polyvalent alkylene group of 2 to 20 carbon atoms or a polyvalent cyclic substituent of 5 to 30 carbon atoms, the alkylene group in the polyvalent alkylene group may optionally be substituted with oxygen such that no oxygen atoms are adjacent to each other and may optionally be substituted with an alkyl group of 5 to 20 carbon atoms (where the alkylene group in the group is optionally substituted with oxygen such that no oxygen atoms are adjacent to each other) or a cyclic substituent, preferably with two or more cyclic substituents.

Specific polymerizable compounds represented by general formula (VI) include compounds represented by general formula (XIa).

[Chem. 34]

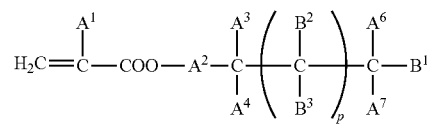

(XIa)

In the formula,
$A^1$ is hydrogen or methyl;
$A^2$ is a single bond or an alkylene group of 1 to 8 carbon atoms (where one or more methylene groups in the alkylene group are each independently optionally replaced with oxygen, —CO—, —COO—, or —OCO— such that no oxygen atoms are directly linked to each other, and one or more hydrogen atoms in the alkylene group are each independently optionally replaced with fluorine, methyl, or ethyl);
$A^3$ and $A^6$ are each independently hydrogen, halogen, or an alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or an alkyl group of 1 to 17 carbon atoms);
$A^4$ and $A^7$ are each independently hydrogen, halogen, or an alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or an alkyl group of 1 to 9 carbon atoms); p is 1 to 10; and
$B^1$, $B^2$, and $B^3$ are each independently hydrogen or a linear or branched alkyl group of 1 to 10 carbon atoms (where one or more methylene groups in the alkyl group are each independently optionally replaced with oxygen, —CO—, —COO—, or —OCO— such that no oxygen atoms are directly linked to each other, and one or more hydrogen atoms in the alkyl group are each independently optionally replaced with halogen or a trialkoxysilyl group of 3 to 6 carbon atoms.

Other specific polymerizable compounds represented by general formula (VI) include compounds represented by general formula (XIb).

[Chem. 35]

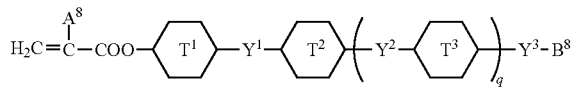

(XIb)

In the formula,

A⁸ is hydrogen or methyl; and the six-membered rings, $T^1$, $T^2$, and $T^3$, are each independently any of the following structures.

[Chem. 36]

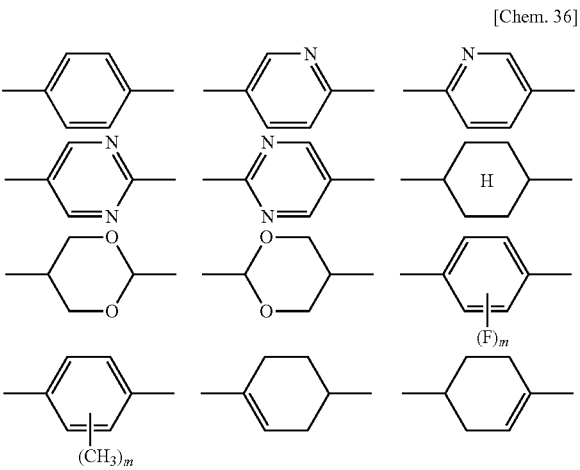

In the structures, q is an integer of 1 to 4.

In general formula (XIb) above, q is 0 or 1;

$Y^1$ and $Y^2$ are each independently a single bond, —CH₂CH₂—, —CH₂O—, —OCH₂—, —COO—, —OCO—, —C≡C—, —CH=CH—, —CF=CF—, —(CH₂)₄—, —CH₂CH₂CH₂O—, —OCH₂CH₂CH₂—, —CH₂=CHCH₂CH₂—, or —CH₂CH₂CH=CH—;

$Y^3$ is a single bond, —COO—, or —OCO—; and $B^3$ is a hydrocarbyl group of 1 to 18 carbon atoms.

Still other specific polymerizable compounds represented by general formula (VI) include compounds represented by general formula (XIc).

[Chem. 37]

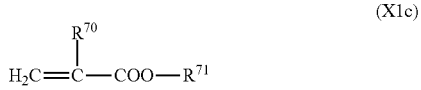
(XIc)

In the formula, $R^{70}$ is hydrogen or methyl, and $R^{71}$ is a hydrocarbyl group having a fused ring.

Among reactive-group-containing polymerizable compounds, preferred polyfunctional reactive-group-containing polymerizable compounds include polymerizable compounds represented by general formula (V) below.

[Chem. 38]

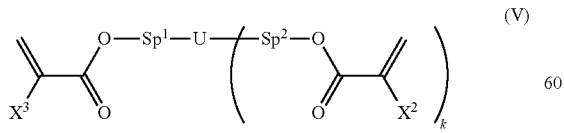
(V)

In the formula, $X^1$ and $X^2$ are each independently hydrogen or methyl; $Sp^1$ and $Sp^2$ are each independently a single bond, an alkylene group of 1 to 8 carbon atoms, or —O—(CH₂)ₛ— (where s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, where the alkylene group in the polyvalent alkylene group is optionally substituted with oxygen such that no oxygen atoms are adjacent to each other and is optionally substituted with an alkyl group of 5 to 20 carbon atoms (where the alkylene group in the group is optionally substituted with oxygen such that no oxygen atoms are adjacent to each other) or a cyclic substituent; and k is an integer of 1 to 5.

Although $X^1$ and $X^2$ in general formula (V) above are each independently hydrogen or methyl, $X^1$ and $X^2$ are preferably hydrogen if it is desirable to achieve a higher reaction rate and are preferably methyl if it is desirable to achieve a lower residual monomer content.

Although $Sp^1$ and $Sp^2$ in general formula (V) above are each independently a single bond, an alkylene group of 1 to 8 carbon atoms, or —O—(CH₂)ₛ— (where s is an integer of 2 to 7, and the oxygen atom is linked to the aromatic ring), shorter carbon chains are preferred. Specifically, $Sp^1$ and $Sp^2$ are preferably a single bond or an alkylene group of 1 to 5 carbon atoms, more preferably a single bond or an alkylene group of 1 to 3 carbon atoms. If $Sp^1$ and $Sp^2$ are —O—(CH₂)ₛ—, s is preferably 1 to 5, more preferably 1 to 3. More preferably, at least one of $Sp^1$ and Sp is a single bond, and even more preferably, both of them are single bonds.

Although U in general formula (V) above is a linear or branched polyvalent alkylene group of 2 to 20 carbon atoms or a polyvalent cyclic substituent of 5 to 30 carbon atoms, the alkylene group in the polyvalent alkylene group may optionally be substituted with oxygen such that no oxygen atoms are adjacent to each other and may optionally be substituted with an alkyl group of 5 to 20 carbon atoms (where the alkylene group in the group is optionally substituted with oxygen such that no oxygen atoms are adjacent to each other) or a cyclic substituent, preferably with two or more cyclic substituents.

Specifically, U in general formula (V) above is preferably any of formulas (Va-1) to (Va-5) below, more preferably any of formulas (Va-1) to (Va-3), even more preferably formula (Va-1).

[Chem. 39]

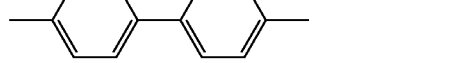
(Va-1)

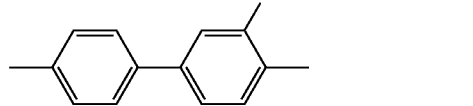
(Va-2)

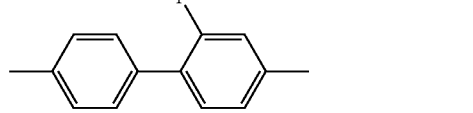
(Va-3)

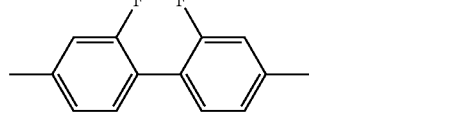
(Va-4)

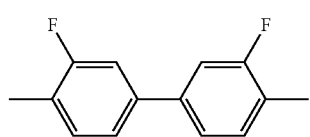
(Va-5)

In the formulas, both ends are linked to $Sp^1$ and $Sp^2$.

If U has a cyclic structure, it is preferred that at least one of $Sp^1$ and $Sp^2$ be a single bond, and it is also preferred that both be single bonds.

Although k in general formula (V) above is an integer of 1 to 5, difunctional compounds, where k is 1, and trifunctional compounds, where k is 2, are preferred, and difunctional compounds are more preferred.

Specific preferred compounds represented by general formula (V) above include compounds represented by general formula (Vb) below.

[Chem. 40]

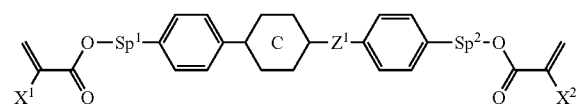
(Vb)

In the formula, $X^1$ and $X^2$ are each independently hydrogen or methyl; $Sp^1$ and $Sp^2$ are each independently a single bond, an alkylene group of 1 to 8 carbon atoms, or —O—$(CH_2)_s$— (where s is an integer of 2 to 7, and the oxygen atom is linked to the aromatic ring); $Z^1$ is —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$—, —C≡C—, or a single bond; and C is 1,4-phenylene, trans-1,4-cyclohexylene, or a single bond. Any hydrogen atom in any 1,4-phenylene group in the formula is optionally replaced with fluorine.

Although $X^1$ and $X^2$ in general formula (Vb) above are each independently hydrogen or methyl, diacrylate derivatives, where both $X^1$ and $X^2$ are hydrogen, and dimethacrylate derivatives, where both $X^1$ and $X^2$ are methyl, are preferred. Also preferred are compounds where one of $X^1$ and $X^2$ is hydrogen and the other is methyl. Among these compounds, diacrylate derivatives have the highest rates of polymerization, dimethacrylate derivatives have the lowest rates of polymerization, and asymmetrical compounds have intermediate rates of polymerization. Any suitable compound may be used depending on the application. In particular, dimethacrylate derivatives are preferred for PSA liquid crystal display devices.

Although $Sp^1$ and $Sp^2$ in general formula (Vb) above are each independently a single bond, an alkylene group of 1 to 8 carbon atoms, or —O—$(CH_2)_s$—, compounds where at least one of $Sp^1$ and $Sp^2$ is a single bond are preferred for PSA liquid crystal display devices. Specifically, compounds where both of $Sp^1$ and $Sp^2$ are single bonds and compounds where one of $Sp^1$ and $Sp^2$ is a single bond and the other is an alkylene group of 1 to 8 carbon atoms or —O—$(CH_2)_s$— are preferred. In this case, an alkylene group of 1 to 4 carbon atoms is preferred, and s is preferably 1 to 4.

Although $Z^1$ in general formula (Vb) above is —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$—, —C≡C—, or a single bond, $Z^1$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably —COO—, —OCO—, or a single bond, even more preferably a single bond.

Although C in general formula (Vb) above is 1,4-phenylene or trans-1,4-cyclohexylene where any hydrogen atom is optionally replaced with fluorine, or a single bond, C is preferably 1,4-phenylene or a single bond. If C is a cyclic structure, rather than a single bond, Z is also preferably a linking group other than a single bond. If C is a single bond, $Z^1$ is preferably a single bond.

As discussed above, C in general formula (Vb) above is preferably a single bond, and the cyclic structure is preferably composed of two rings. Specific preferred polymerizable compounds having a cyclic structure include compounds represented by general formulas (V-1) to (V-6) below, more preferably compounds represented by general formulas (V-1) to (V-4), most preferably a compound represented by general formula (V-2).

[Chem. 41]

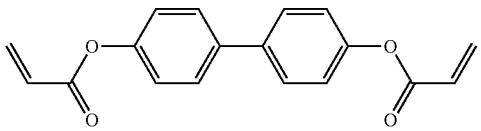
(V-1)

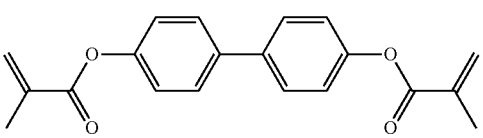
(V-2)

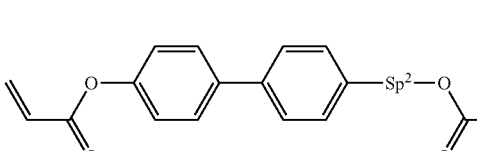
(V-3)

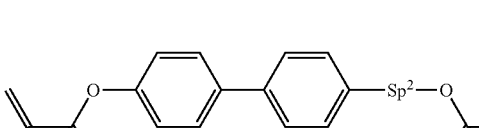
(V-4)

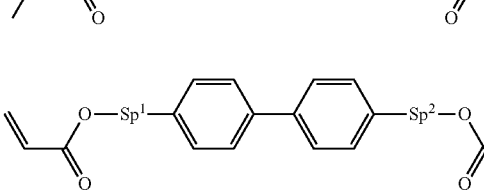
(V-5)

-continued (V-6)

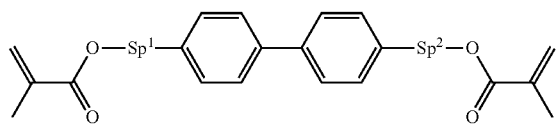

Other specific preferred compounds represented by general formula (V) above include compounds represented by general formula (Vc) below.

[Chem. 42]

(Vc)

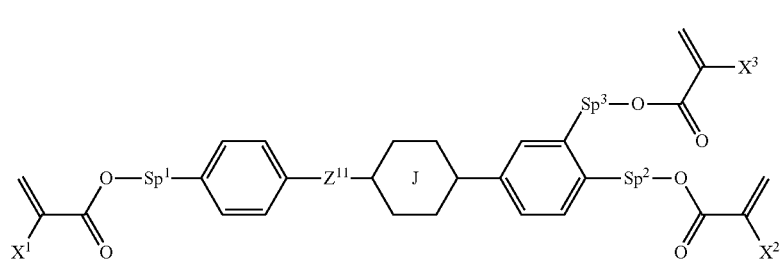

In the formula, $X^1$, $X^2$, and $X^3$ are each independently hydrogen or methyl; $Sp^1$, $Sp^2$, and $Sp^3$ are each independently a single bond, an alkylene group of 1 to 8 carbon atoms, or —O—$(CH_2)_s$— (where s is an integer of 2 to 7, and the oxygen atom is linked to the aromatic ring); $Z^{11}$ and $Z^{12}$ are each independently —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond; and J is 1,4-phenylene, trans-1,4-cyclohexylene, or a single bond. Any hydrogen atom in any 1,4-phenylene group in the formula is optionally replaced with fluorine.

If a polymerizable monomer is added, polymerization proceeds without the use of a polymerization initiator; however, a polymerization initiator may be added to promote the polymerization. Examples of polymerization initiators include benzoin ethers, benzophenones, acetophenones, benzyl ketals, and acylphosphine oxides. A stabilizer may also be added to improve storage stability. Examples of stabilizers that can be used include hydroquinones, hydroquinone monoalkyl ethers, tert-butylcatechols, pyrogallols, thiophenols, nitro compounds, β-naphthylamines, β-naphthols, and nitroso compounds.

A liquid crystal layer containing a polymerizable monomer is useful in liquid crystal display devices, particularly active-matrix-driven liquid crystal display devices, including PSA, PSVA, VA, IPS, and ECB liquid crystal display devices.

A liquid crystal layer containing a polymerizable monomer acquires the ability to align liquid crystal molecules when the polymerizable monomer present therein is polymerized by exposure to ultraviolet radiation. The liquid crystal layer is used in a liquid crystal display device that controls the intensity of transmitted light by means of the birefringence of the liquid crystal composition.

As discussed above, liquid crystal display devices including oxide semiconductor thin-film transistors have the problem of the diffusion of oxygen desorbed from the oxide semiconductor layer 113 into the insulating layer 118 covering the oxide semiconductor layer 113. As shown in FIG. 3, the oxide semiconductor layer 113 is separated from the liquid crystal composition only by members such as the insulating layer 118 and the alignment layer 4. Since these members are thin, typically 0.1 μm or less thick, they cannot sufficiently reduce the influence of oxygen desorbed from the oxide semiconductor layer on the liquid crystal layer.

However, the use of a particular liquid crystal composition in the liquid crystal display device according to the present invention reduces the influence of the interaction between the oxide semiconductor layer and the liquid crystal composition. The liquid crystal display device according to the present invention does not exhibit a significant decrease in voltage holding ratio (VHR) or increase in ion density (ID) of the liquid crystal layer and thus does not suffer from display defects such as white spots, uneven alignment, and image-sticking and also consumes less power.

Second Embodiment

A liquid crystal display device according to a second embodiment of the present invention includes oxide semiconductor thin-film transistors and a particular liquid crystal composition and generates an electric field containing a component parallel to the substrate surface. The liquid crystal display device according to the second preferred embodiment is an in-plane switching (IPS) liquid crystal display device or a fringe-field switching (FFS) liquid crystal display device, which is a type of IPS liquid crystal display device.

An IPS liquid crystal display device according to the second preferred embodiment of the present invention preferably includes first and second opposing substrates, a liquid crystal layer containing a liquid crystal composition between the first and second substrates, a plurality of gate lines and data lines arranged in a matrix on the first substrate, thin-film transistors disposed at intersections of the gate lines and the data lines, and pixel electrodes that are driven by the transistors and that are made of a transparent conductive material. Each thin-film transistor preferably includes a gate electrode, an oxide semiconductor layer disposed over the gate electrode with an insulating layer therebetween, and source and drain electrodes electrically connected to the oxide semiconductor layer. The thin-film transistors are preferably disposed at the intersections of the gate lines and the data lines. The pixel electrodes are preferably connected to the thin-film transistors. The liquid crystal display device preferably further includes common electrodes disposed on the first or second substrate and separated from the pixel electrodes and alignment layers that are disposed between the first and second substrates and the liquid crystal layer and close to the liquid crystal layer and that induce homogeneous alignment to the liquid crystal composition. The first and second substrates are preferably transparent insulating substrates. The pixel electrodes and the common electrodes are preferably arranged such that the shortest path from the pixel electrodes to the common electrodes located close to the pixel electrodes contains a component parallel to the first or second substrate.

By "the shortest path from the pixel electrodes to the common electrodes located close to the pixel electrodes contains a component parallel to the first or second substrate", it is meant that the direction vector indicating the shortest path from the pixel electrodes to the common electrodes located closest to the pixel electrodes contains a component parallel to the first or second substrate. For example, if the pixel electrodes and the counter electrodes overlap each other in the direction perpendicular to the first or second substrate, the shortest path from the pixel electrodes to the common electrodes located close to the pixel electrodes is perpendicular to the first or second substrate; therefore, it contains no component parallel to the first or second substrate. That is, the pixel electrodes and the counter electrodes are arranged such that they do not overlap each other in the direction perpendicular to the first or second substrate. The counter electrodes may be disposed either on the first substrate or on the second substrate.

Since the common electrodes and the pixel electrodes are separated such that they do not overlap each other in the direction perpendicular to the first or second substrate, an electric field (E) containing a planar component can be generated between the common electrodes and the pixel electrodes. For example, if alignment layers are used that induce homogeneous alignment to the liquid crystal composition, the liquid crystal molecules are aligned in the alignment direction of the alignment layers, i.e., in the planar direction, thereby blocking light, before a voltage is applied across the common electrodes and the pixel electrodes. When a voltage is applied, the liquid crystal molecules are rotated horizontally relative to the substrate by the planar electric field (E) and are aligned in the electric field direction, thereby transmitting light.

An FFS liquid crystal display device according to the second preferred embodiment of the present invention preferably includes first and second opposing substrates, a liquid crystal layer containing a liquid crystal composition between the first and second substrates, a plurality of gate lines and data lines arranged in a matrix on the first substrate, thin-film transistors disposed at intersections of the gate lines and the data lines, and pixel electrodes that are driven by the transistors and that are made of a transparent conductive material. Each thin-film transistor preferably includes a gate electrode, an oxide semiconductor layer disposed over the gate electrode with an insulating layer therebetween, and source and drain electrodes electrically connected to the oxide semiconductor layer. The liquid crystal display device preferably further includes common electrodes disposed on the first substrate and separated from the pixel electrodes and alignment layers that are disposed between the first and second substrates and the liquid crystal layer and close to the liquid crystal layer and that induce homogeneous alignment to the liquid crystal composition. The first and second substrates are preferably transparent insulating substrates. The pixel electrodes and the common electrodes are preferably arranged such that the shortest distance d between the common electrodes and the pixel electrodes located close to each other is shorter than the shortest distance G between the alignment layers.

As used herein, the term "IPS liquid crystal display device" refers to a liquid crystal display device in which the shortest distance d between the common electrodes and the pixel electrodes is longer than the shortest distance G between the alignment layers, whereas the term "FFS liquid crystal display device" refers to a liquid crystal display device in which the shortest distance d between the common electrodes and the pixel electrodes located close to each other is shorter than the shortest distance G between the alignment layers. The only requirement for FFS is that the shortest distance d between the common electrodes and the pixel electrodes located close to each other is shorter than the shortest distance G between the alignment layers; therefore, there may be any positional relationship between the surfaces of the common electrodes and the pixel electrodes in the thickness direction. Example FSS liquid crystal display devices according to the present invention include those in which the pixel electrodes are disposed closer to the liquid crystal layer than are the common electrodes, as shown in FIGS. 4 to 8, and those in which the pixel electrodes and the common electrodes are disposed on the same surface, as shown in FIG. 9.

Figure 4:
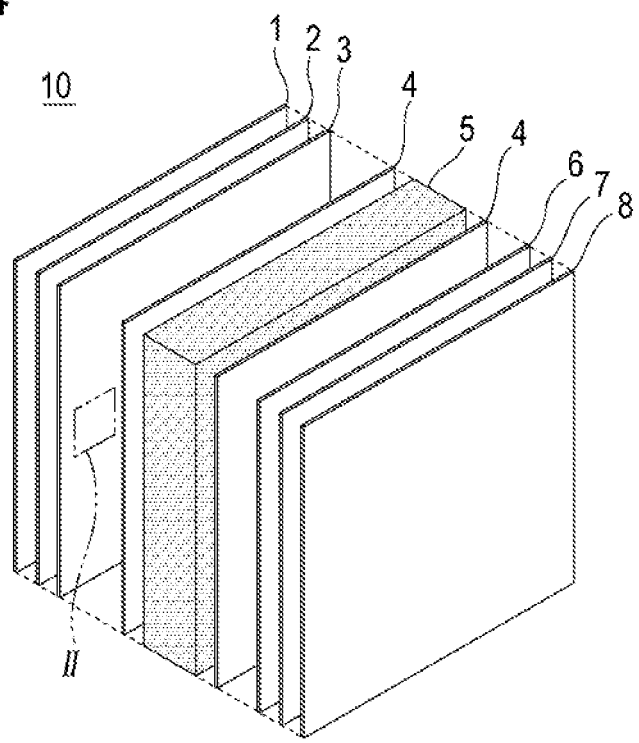
FIG. 4 is a schematic exploded perspective view illustrating the structure of a liquid crystal display device.

An example FFS liquid crystal display device according to the second embodiment of the present invention will now be described with reference to FIGS. 4 to 9. FIG. 4 is a schematic exploded perspective view illustrating the structure of a liquid crystal display device, i.e., an FFS liquid crystal display device. A liquid crystal display device 10 according to the present invention includes, in sequence, a first polarizer 1, a first substrate 2, an electrode layer 3 including thin-film transistors (also referred to as "thin-film transistor layer"), an alignment layer 4, a liquid crystal layer 5 containing a liquid crystal composition, an alignment layer 4, a color filter 6, a second substrate 7, and a second polarizer 8. As shown in FIG. 4, the first substrate 2 and the second substrate 7 may be disposed between the pair of polarizers 1 and 8. As shown in FIG. 4, the color filter 6 is disposed between the second substrate 7 and the alignment layer 4. The pair of alignment layers 4 may be formed on the (transparent) electrode (layer) 3 such that they are located close to the liquid crystal layer 5 and in direct contact with the liquid crystal composition forming the liquid crystal layer 5.

The FFS liquid crystal display device utilizes a fringe field, which is formed between the common electrodes and the pixel electrodes since the shortest distance d between the common electrodes and the pixel electrodes located close to each other is shorter than the shortest distance G between the alignment layers. This allows horizontal alignment and vertical alignment of liquid crystal molecules to be efficiently utilized. Specifically, the FFS liquid crystal display device can utilize a horizontal electric field perpendicular to the lines forming the comb-shaped pattern of pixel electrodes 21 and a parabolic electric field.

Figure 5:
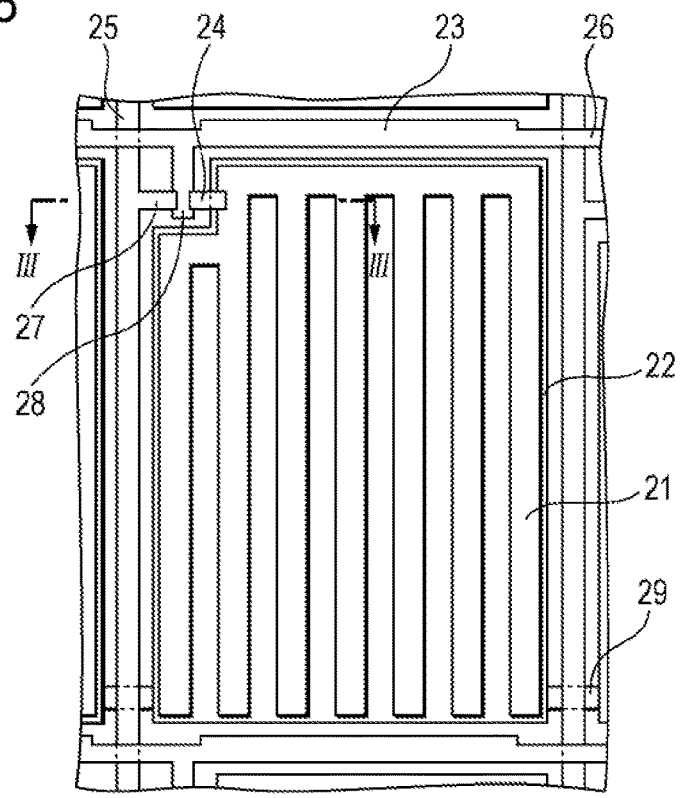
FIG. 5 is an example of an enlarged plan view of an area enclosed by line II of an electrode layer 3 including thin-film transistors formed on a substrate in FIG. 4.

FIG. 5 is an enlarged plan view of an area enclosed by line II of the electrode layer 3 including the thin-film transistors formed on the substrate in FIG. 4. The thin-film transistors are disposed near intersections of gate lines 26 and data lines 25 and are coupled to the pixel electrodes 21, serving as switching elements for supplying display signals to the pixel electrodes 21. Each thin-film transistor includes a source electrode 27, a drain electrode 24, and a gate electrode 28.

In the example in FIG. 4, planar common electrodes 22 are formed below the comb-shaped pixel electrodes 21 with an insulating layer (not shown) therebetween. The surfaces of the pixel electrodes 21 may be covered with a protective insulating layer and an alignment layer. Storage capacitors 23 for storing display signals supplied via the data lines 25 may be disposed in the areas surrounded by the gate lines 26 and the data lines 25. Common lines 29 extend parallel to the gate lines 26 and are coupled to the common electrodes 22 to supply common signals to the common electrodes 22.

Figure 6:
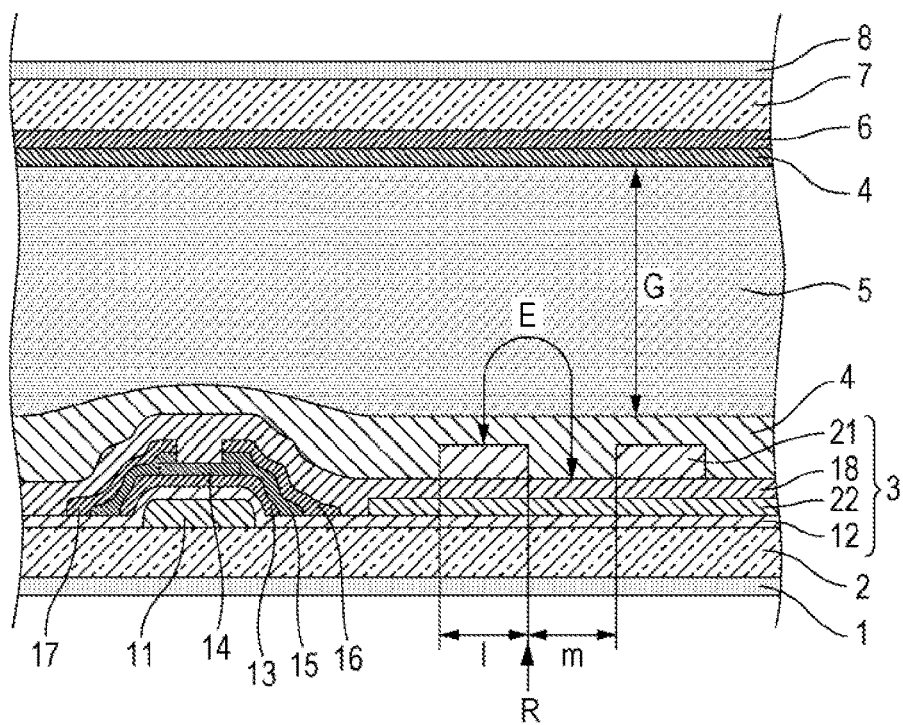
FIG. 6 is an example of a sectional view of the liquid crystal display device taken along line III-III in FIG. 5.

FIG. 6 is an example of a sectional view of the liquid crystal display device taken along line III-III in FIG. 5. The first substrate 2 having the alignment layer 4 and the electrode layer 3, including the thin-film transistors (11, 12, 13, 14, 15, 16, and 17), formed thereon and the second substrate 7 having the alignment layer 4 formed thereon are separated from each other by a predetermined distance G such that the alignment layers 4 face each other. This space is filled with the liquid crystal layer 5 containing the liquid crystal composition. A gate insulating layer 12 is formed on part of the surface of the first substrate 2. The common electrodes 22 are formed on part of the surface of the gate insulating layer 12. An insulating layer 18 is formed over the common electrodes 22 and the thin-film transistors. The pixel electrodes 21 are disposed on the insulating layer 18. The pixel electrodes 21 face the liquid crystal layer 5 with the alignment layer 4 therebetween. The minimum distance d between the pixel electrodes and the common electrodes can be adjusted depending on the (average) thickness of the gate insulating layer 12. In other words, the distance between the pixel electrodes and the common electrodes in the direction parallel to the substrates in the embodiment in FIG. 6 is zero. The electrode width 1 of the comb-shaped pixel electrodes 21 and the gap width m of the comb-shaped pixel electrodes 21 are preferably selected so that the resulting electric field can drive all liquid crystal molecules in the liquid crystal layer 5.

For the FFS liquid crystal display device, in which the shortest distance d between the common electrodes and the pixel electrodes located close to each other is shorter than the shortest distance G between the alignment layers, as shown in FIGS. 4 to 8, a voltage applied to the liquid crystal molecules, which have the major axes thereof aligned parallel to the alignment direction of the alignment layers, generates a parabolic electric field between the pixel electrodes 21 and the common electrodes 22. The equipotential lines of the parabolic electric field extend above the pixel electrodes 21 and the common electrodes 22. The liquid crystal molecules in the liquid crystal layer 5 are rotated along the resulting electric field and serve as switching elements. More specifically, for example, if alignment layers are used that induce homogeneous alignment to the liquid crystal composition, the liquid crystal molecules are aligned in the alignment direction of the alignment layers, i.e., in the planar direction, thereby blocking light, before a voltage is applied across the common electrodes and the pixel electrodes. When a voltage is applied, a planar electric field is generated since the common electrodes and the pixel electrodes are separated from each other on the same substrate (or electrode layer), and a perpendicular electric field (fringe field) is generated at the fringes of the electrodes since the shortest distance d between the common electrodes and the pixel electrodes located close to each other is shorter than the shortest distance G between the alignment layers. These electric fields can drive liquid crystal molecules with low dielectric anisotropy. This allows the amount of compound with high dielectric anisotropy ($\Delta\varepsilon$) to be minimized and thus allows a larger amount of compound with low viscosity to be used in the liquid crystal composition.

The rubbing direction of the alignment layers 4 in the second embodiment is preferably selected such that the major axes of the liquid crystal molecules are aligned at an angle θ of about 0° to 45° with respect to the x-axis, which is parallel to the lines forming the comb-shaped pattern of the pixel electrodes 21. The liquid crystal composition used in the second embodiment is of the same type as the liquid crystal composition described in the first embodiment, i.e., a liquid crystal composition with positive dielectric anisotropy. When no voltage is applied, the liquid crystal molecules are aligned such that the major axes thereof are parallel to the alignment direction of the alignment layers 4. When a voltage is applied, the liquid crystal molecules, which have positive dielectric anisotropy, are rotated such that the major axes thereof are substantially parallel to the direction of the resulting electric field. Thus, the FFS liquid crystal display device including liquid crystal molecules with positive dielectric anisotropy has superior transmittance characteristics.

Figure 7:
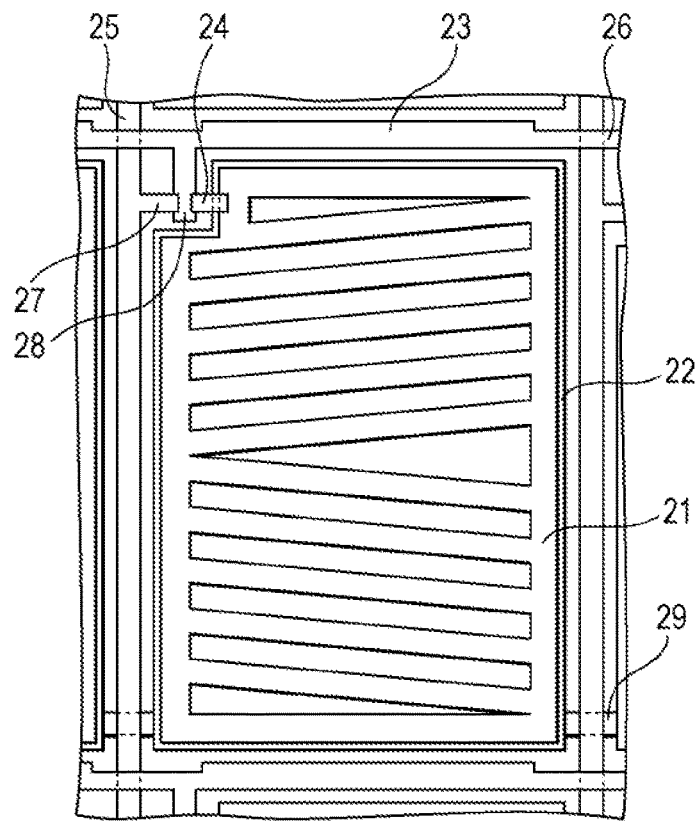
FIG. 7 is another example of an enlarged plan view of the area enclosed by line II of the electrode layer 3 including the thin-film transistors formed on the substrate in FIG. 4.

FIG. 7 is another example of an enlarged plan view of the area enclosed by line II of the electrode layer 3 including the thin-film transistors (also referred to as "thin-film transistor layer 3") formed on the substrate in FIG. 4. The thin-film transistors are disposed near intersections of gate lines 26 and data lines 25 and are coupled to the pixel electrodes 21, serving as switching elements for supplying display signals to the pixel electrodes 21. Each thin-film transistor includes a source electrode 27, a drain electrode 24, and a gate electrode 28. Each pixel electrode 21 may have at least one cutout. An example of such a pixel electrode 21 is shown in FIG. 7. The pixel electrode 21 is formed in a rectangular planar shape with triangular cutouts in the center and at both ends thereof and eight rectangular cutouts in the remaining region, and the common electrode 22 is comb-shaped (not shown). The surfaces of the pixel electrodes may be covered with a protective insulating layer and an alignment layer. Storage capacitors 23 for storing display signals supplied via the data lines 24 may be disposed in the areas surrounded by the gate lines 25 and the data lines 24. The pixel electrodes 21 may have any number of cutouts formed in any shape.

Figure 8:
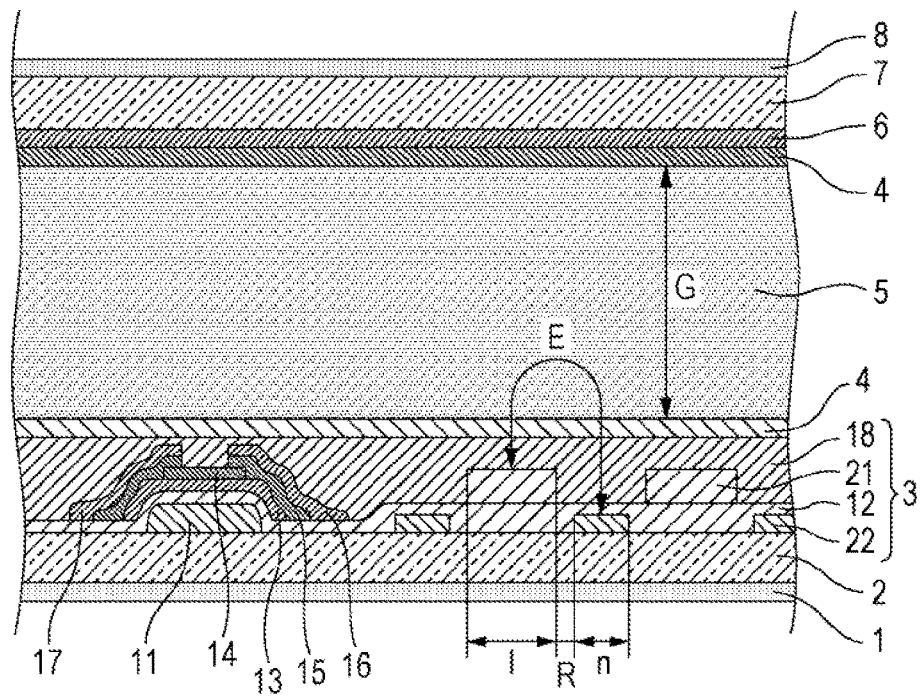
FIG. 8 is another example of a sectional view of the liquid crystal display device taken along line III-III in FIG. 5.
Figure 9:
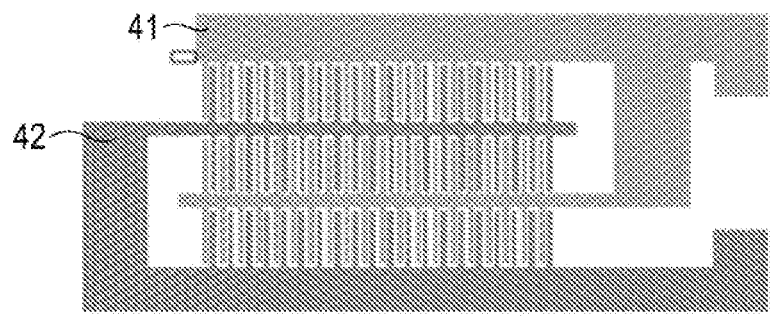
FIG. 9 is an enlarged plan view of the electrode structure of a liquid crystal display device. A sectional view of a color-filter-on-array liquid crystal display device.

FIG. 8 is another example of a sectional view of the liquid crystal display device, which is taken at a position in FIG. 7 similar to line III-III in FIG. 6. Specifically, this liquid crystal display device and the liquid crystal display device in FIG. 6 differ in that the liquid crystal display device in FIG. 5 includes planar common electrodes and comb-shaped pixel electrodes. As described above, the pixel electrodes 21 of the liquid crystal display device in FIG. 7 are formed in a rectangular planar shape with triangular cutouts in the center and at both ends thereof and eight rectangular cutouts in the remaining region, and the common electrodes 22 are comb-shaped. The minimum distance d between the pixel electrodes and the common electrodes is not smaller than the (average) thickness of the gate insulating layer 12 and is smaller the distance G between the alignment layers. Although the common electrodes shown in FIG. 8 are comb-shaped, they may instead be planar in this embodiment. In either case, the FFS liquid crystal display device according to the present invention needs only to satisfy the requirement that the shortest distance d between the common electrodes and the pixel electrodes located close to each other is shorter than the shortest distance G between the alignment layers. Whereas the pixel electrodes 21 of the liquid crystal display device in FIG. 8 are covered with the protective layer 18, the pixel electrodes 21 of the liquid crystal display device in FIG. 5 are covered with the alignment layer 4. In the present invention, the pixel electrodes may be covered with either a protective layer or an alignment layer.

In FIG. 8, the polarizer is formed on one surface of the first substrate 2. The comb-shaped common electrodes 22 are formed on part of the other surface of the first substrate 2. The gate insulating layer 12 is formed over the common electrodes 22. The pixel electrodes 21 are formed on part of the surface of the gate insulating layer 12. The insulating layer 18 is formed over the pixel electrodes 21 and the thin-film transistors 20. The alignment layer 4, the liquid crystal layer 5, the alignment layer 4, the color filter 6, the second substrate 7, and the polarizer 8 are deposited on the insulating layer 18. The shortest distance d between the common electrodes and the pixel electrodes can be adjusted depending on the positions of both electrodes, the electrode width l of the comb-shaped pixel electrodes 21, and the gap width m of the comb-shaped pixel electrodes 21.

As shown in FIG. 8, the pixel electrodes are disposed closer to the second substrate than are the common electrodes. A planar electric field can be formed between the common electrodes and the pixel electrodes since they are disposed parallel to each other on the first substrate. At the same time, an electric field (E) extending in the thickness direction can be formed since the surfaces of the pixel electrodes and the common electrodes differ in height in the thickness direction.

The FFS liquid crystal display device, which utilizes a fringe field, may have any configuration in which the shortest distance d between the common electrodes and the pixel electrodes located close to each other is shorter than the shortest distance G between the alignment layers. For example, as shown in FIG. 9, comb-shaped pixel electrodes 41 and comb-shaped common electrodes 42 may be disposed on the same surface, i.e., on the first substrate 2, such that the teeth of the pixel electrodes 41 mesh with the teeth of the common electrodes 42 without contact therebetween. In this case, an IPS liquid crystal display device can be constructed if the distance between the teeth of the common electrodes 42 and the teeth of the pixel electrodes 41 is longer than the shortest distance G between the alignment layers, whereas an FFS liquid crystal display device, which utilizes a fringe field, can be constructed if the distance between the teeth of the common electrodes 42 and the teeth of the pixel electrodes 41 is shorter than the shortest distance G between the alignment layers.

Thin-Film Transistors

The thin-film transistors shown in FIGS. 6 and 8 include a gate electrode 11 formed on the substrate 2, a gate insulating layer 12 covering the gate electrode 11 and substantially the entire surface of the substrate 2, a semiconductor layer 13 formed on the gate insulating layer 12 and opposite the gate electrode 11, a protective layer 14 covering part of the surface of the semiconductor layer 13, a drain electrode 16 covering one end of the protective layer 14 and the semiconductor layer 13 and contacting the gate insulating layer 12 formed on the substrate 2, a source electrode 17 covering the other end of the protective layer 14 and the semiconductor layer 13 and contacting the gate insulating layer 12 formed on the substrate 2, and an insulating protective layer 18 covering the drain electrode 16 and the source electrode 17. These thin-film transistors differ from the thin-film transistors described with reference to FIG. 3 in the first embodiment in that the protective layer 14 covers part of the surface of the semiconductor layer 13. The protective layer 14 separates the liquid crystal layer 5 from the semiconductor layer 13, which is made of an oxide semiconductor, thus reducing the influence of oxygen desorbed from the oxide semiconductor layer on the liquid crystal layer.

The insulating layer 18 of the thin-film transistors shown in FIG. 8 covers the pixel electrodes 21 and the thin-film transistors 20. The insulating layer 18 separates the liquid crystal layer 5 from the semiconductor layer 13, which is made of an oxide semiconductor, thus reducing the influence of oxygen desorbed from the oxide semiconductor layer on the liquid crystal layer.

The first substrate 2, second substrate 7, transparent electrode 6, color filter 6, alignment layers 4, and liquid crystal layer 5 of the FFS liquid crystal display device shown in FIGS. 4 to 8 are similar to the first substrate 102, second substrate 109, transparent electrode 107, color filter 108, alignment layers 104 and 106, and liquid crystal layer 105 in the first embodiment and are therefore not described herein.

As shown in FIGS. 6 and 8, the oxide semiconductor layer 13 of the liquid crystal display device according to the second embodiment is separated from the liquid crystal composition only by members such as the insulating layer 18, the alignment layer 4, and the protective layer 14. Since these members are generally thin, they cannot sufficiently reduce the influence of oxygen desorbed from the oxide semiconductor layer on the liquid crystal layer.

However, the use of a particular liquid crystal composition in the liquid crystal display device according to the present invention reduces the influence of the interaction between the oxide semiconductor layer and the liquid crystal composition. The liquid crystal display device according to the present invention does not exhibit a significant decrease in voltage holding ratio (VHR) or increase in ion density (ID) of the liquid crystal layer and thus does not suffer from display defects such as white spots, uneven alignment, and image-sticking and also consumes less power.

Third Embodiment

Figure 10:
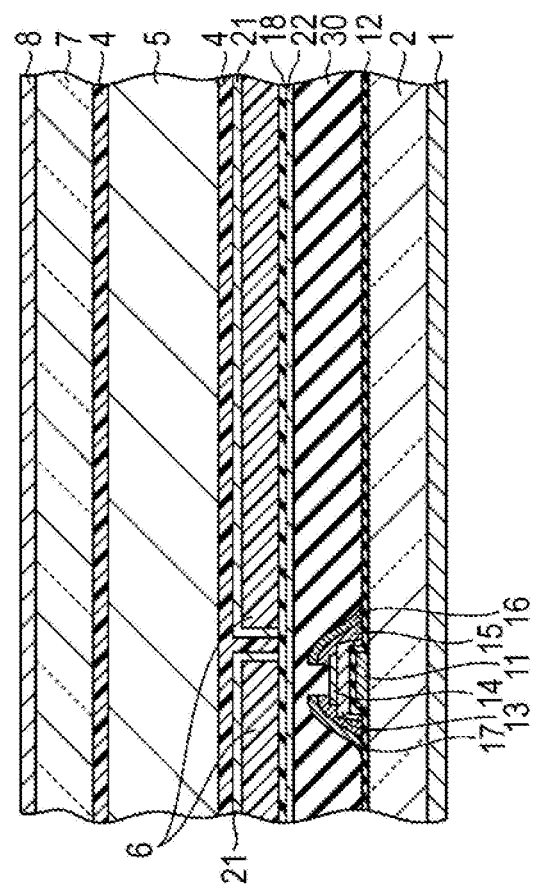
FIG. 10 is a sectional view of a color-filter-on-array liquid crystal display device.

A liquid crystal display device according to a third embodiment of the present invention includes oxide semiconductor thin-film transistors and a particular liquid crystal composition. The liquid crystal display device preferably includes color filters 6 formed on the same substrate as the electrode layer 3 including the thin-film transistors, i.e., on the first substrate. This structure is commonly known as color-filter-on-array (COA). Specific structures will now be described with reference to FIGS. 10 and 11. FIG. 10 is another example of a sectional view of a liquid crystal display device. A first substrate 2 having an alignment layer 4, thin-film transistors (11, 13, 15, 16, and 17), color filters 6, and pixel electrodes 21 formed thereon and a second substrate 7 having an alignment layer 4 formed thereon are separated from each other such that the alignment layers 4 face each other. This space is filled with a liquid crystal layer 5 containing a liquid crystal composition. The thin-film transistors and a gate insulating layer 12 are formed on part of the surface of the first substrate 2. A buffer layer 30 serving as a planarization layer covers the thin-film transistors. The color filters 6, the pixel electrodes 21, and the alignment layer 4 are deposited in the above order on the buffer layer 30. Unlike the structure in FIG. 6, there is no color filter 6 on the second substrate 7.

The liquid crystal display device has a rectangular display area located in the center thereof and a rectangular non-display area extending around the periphery of the display area. Red, green, and blue color filters are formed in the display area. More specifically, the peripheries of the color filters overlap signal lines (such as data lines and gate lines).

The pixel electrodes 21, which are made of a transparent conductive film such as ITO film, are disposed on the color filters. The individual pixel electrodes 21 are connected to the corresponding thin-film transistors via through-holes (not shown) formed in the insulating layer 18 and the color layers. More specifically, the pixel electrodes 21 are connected to the thin-film transistors via the contact electrodes described above. A plurality of spacers (not shown) such as pillars may be disposed on the pixel electrodes 21. The alignment layer 4 is formed on the color filters and the pixel electrodes 21.

Figure 11:
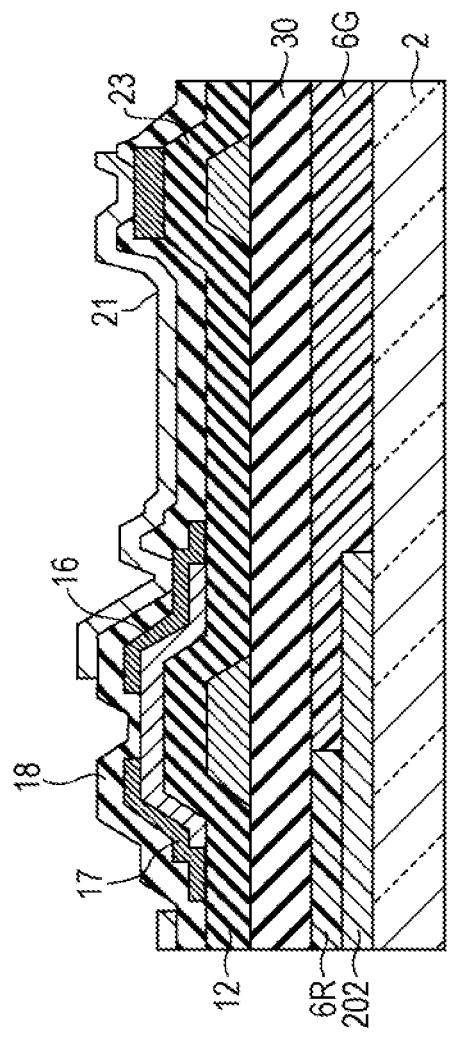
FIG. 11 is a sectional view of another color-filter-on-array liquid crystal display device.

FIG. 11 illustrates a color-filter-on-array liquid crystal display device different from that in FIG. 10, showing the thin-film transistors and the substrate 2 in an enlarged view. Whereas the color filters are disposed closer to the liquid crystal layer than are the thin-film transistors in FIG. 10, the thin-film transistors are disposed closer to the liquid crystal layer than are the color filters in FIG. 11. The thin-film transistors and the color filters are separated by the buffer layer.

Other members such as the oxide semiconductor layer and the liquid crystal layer in the third embodiment are similar to those in the first and second embodiments and are therefore not described herein.

The liquid crystal display devices according to the present invention can be used in combination with backlights for various applications, including liquid crystal display televisions, personal computer monitors, cellular phone and smartphone displays, notebook personal computers, portable information terminals, and digital signage. Examples of backlights include cold cathode fluorescent lamp backlights and two-peak-wavelength and three-peak-wavelength pseudo-white backlights including inorganic light-emitting diodes and organic EL devices.

EXAMPLES

The present invention is further illustrated by the following examples, although these examples are not intended to limit the invention. The percentages for the compositions of the following Examples and Comparative Examples are by mass.

The properties measured in the examples are as follows:
$T_{ni}$: nematic phase-isotropic liquid phase transition temperature (° C.)
Δn: refractive index anisotropy at 25° C.
Δε: dielectric anisotropy at 25° C.
η: viscosity (mPa·s) at 20° C.
γ1: rotational viscosity (mPa·s) at 25° C.
VHR: voltage holding ratio (%) at 70° C. (the percentage of the voltage measured on a cell having a cell thickness of 3.5 μm and filled with a liquid crystal composition at an applied voltage of 5 V, a frame time of 200 ms, and a pulse duration of 64 μs, to the initial applied voltage) ID: ion density ($pC/cm^2$) at 70° C. (the ion density measured on a cell having a cell thickness of 3.5 μm and filled with a liquid crystal composition at an applied voltage of 20 V and a frequency of 0.05 Hz using an MTR-1 measurement system (Toyo Corporation))
Image-Sticking Each liquid crystal display device was evaluated for image-sticking as follows. After a predetermined fixed pattern was displayed within the display area for 1,000 hours, a uniform image was displayed over the entire screen and was visually inspected for image-sticking of the fixed pattern. The liquid crystal display device was rated on the following four-level scale:
A: no image-sticking
B: slight and acceptable image-sticking
C: unacceptable image-sticking
D: severe image-sticking
Transmittance The transmittance of each liquid crystal display device is expressed as the percentage of the transmittance of the device after the injection of the liquid crystal composition to the transmittance of the device before the injection of the liquid crystal composition.

The compounds used in the examples are represented by the following abbreviations.
Cyclic Structures

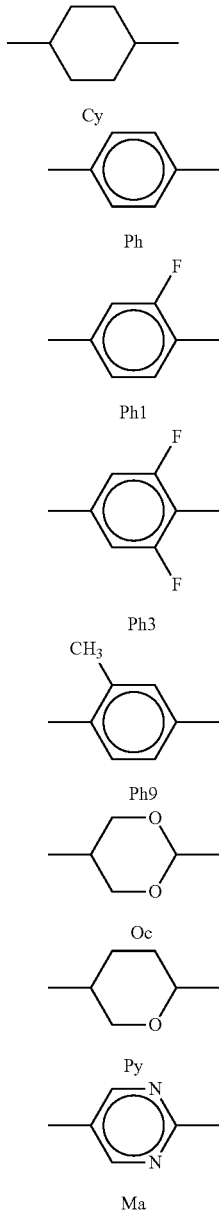

[Chem. 43]

-continued

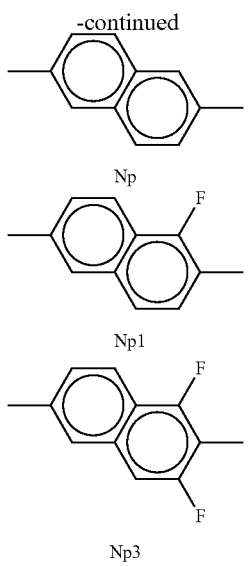

Side Chain Structures and Linking Structures

TABLE 1

| n (number) at end | $C_nH_{2n+1}$— |
|---|---|
| -2- | —$CH_2CH_2$— |
| -1O- | —$CH_2O$— |
| -O1- | —$OCH_2$— |
| -V- | —CO— |

TABLE 1-continued

| -VO- | —COO— |
|---|---|
| -CFFO- | —$CF_2O$— |
| -F | —F |
| -Cl | —Cl |
| -CN | —C≡N |
| -OCFFF | —$OCF_3$ |
| -CFFF | —$CF_3$ |
| -On | —$OC_nH_{2n+1}$— |
| -T- | —C≡C— |
| -N- | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO- | $C_nH_{2n+1}$—HC=CH—$(CH_2)_{m-1}$O— |
| -Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

Example 1

Thin-film transistors including an In—Ga—Zn oxide film as shown in FIG. 3 were formed on a first substrate by sputtering to form a thin-film transistor layer including an electrode structure. Horizontal alignment layers were formed on the opposing surfaces of the first and second substrates and were subjected to weak rubbing. An IPS cell was assembled, and Liquid Crystal Composition 1 shown below was injected between the first and second substrates to obtain a liquid crystal display device of Example 1 ($d_{gap}$=4.0 μm, alignment layer: AL-1051). The resulting liquid crystal display device was tested for VHR and ID and was evaluated for image-sticking. The results are summarized in the following tables.

[Chem. 44]

| Chemical structure | Content | Abbreviation |
|---|---|---|
| $C_3H_7$—⬡—⬡—CH=CH₂ | 48% | 3-Cy—Cy-1d0 |
| $C_3H_7$—⬡—⬡—CH=CH—CH₃ | 4% | 3-Cy—Cy-1d1 |
| $H_3C$—⬢—⬢—CH₂—CH=CH—CH₃ | 8% | 1-Ph—Ph-3d1 |
| $C_3H_7$—⬡—⬢—⬢—$C_2H_5$ | 5% | 3-Cy—Ph—Ph-2 |
| $C_2H_5$—⬢—⬢(F)—⬢—$C_3H_7$ | 5% | 2-Ph—Ph1—Ph-3 |
| $C_3H_7$—⬢—⬢(F,F)—$CF_2O$—⬢(F,F)—F | 2% | 3-Ph—Ph3—CFFO—Ph3—F |

[Chem. 44]

| Chemical structure | Content | Abbreviation |
|---|---|---|
| C₃H₇–Cy–Cy–CF₂O–Ph(F,F,F)–F | 3% | 3-Cy—Cy—CFFO—Ph3—F |
| C₃H₇–Ph–Ph1(F)–Ph3(F,F)–CF₂O–Ph(F,F)–F | 7% | 3-Ph—Ph1—Ph3—CFFO—Ph3—F |
| C₄H₉–Cy–Cy–Ph3(F,F)–CF₂O–Ph(F,F)–F | 5% | 4-Cy—Cy—Ph3—CFFO—Ph3—F |

TABLE 2

| | |
|---|---|
| $T_{NI}/°C$ | 75.8 |
| $\Delta n$ | 0.112 |
| no | 1.488 |
| $\epsilon_\perp$ | 5.5 |
| $\Delta\epsilon$ | 2.9 |
| $\eta/mPa \cdot s$ | 13.5 |

TABLE 3

| | Example 1 |
|---|---|
| Liquid crystal composition | Liquid crystal composition 1 |
| VHR | 99.6 |
| ID | 14 |
| Image-sticking | A |

Liquid Crystal Composition 1 was found to have a liquid crystal layer temperature limit of 75.8° C., which is practical for televisions, a large absolute value of dielectric anisotropy, a low viscosity, and an optimal Δn.

The liquid crystal display device of Example 1 had a high VHR and a low ID. This liquid crystal display device also exhibited no or only slight and acceptable image-sticking.

Examples 2 and 3

Liquid Crystal Compositions 2 and 3 shown in the following tables were injected as in Example 1 to obtain liquid crystal display devices of Examples 2 and 3. The resulting liquid crystal display devices were tested for VHR and ID and were evaluated for image-sticking. The liquid crystal display device of Example 2 was also tested for transmittance. The results are summarized in the following tables.

TABLE 4

| Liquid crystal composition 2 | | Liquid crystal composition 3 | |
|---|---|---|---|
| Compound name | Content (%) | Compound name | Content (%) |
| 4-Cy-Cy-1d0 | 15 | 5-Cy-Cy-1d0 | 5 |
| 0d1-Cy-Cy-Ph-1 | 4 | 3-Cy-Cy-1d1 | 10 |
| 0d3-Cy-Cy-Ph-1 | 14 | 0d1-Cy-Cy-Ph-1 | 8 |
| 3-Cy-Ph—Ph-Cy-3 | 3 | 5-Cy-Cy-Ph—O1 | 6 |
| 3-Cy-Ph—Ph1-Cy-3 | 4 | 2-Ph—Ph1—Ph-3 | 8 |
| 1-Cy-Cy-Ph3—F | 9 | 2-Cy-Cy-Ph3—F | 11 |
| 2-Cy-Ph—Ph3—F | 10 | 3-Cy-Cy-Ph3—F | 15 |
| 3-Cy-Ph—Ph3—F | 10 | 5-Cy-Cy-Ph3—F | 5 |
| 5-Cy-Ph—Ph3—F | 5 | 3-Cy-Ph—Ph3—F | 6 |
| 0d1-Cy-Cy-Ph1—F | 8 | 3-Cy-Ph—Ph1—F | 9 |
| 3-Cy-Cy-Ph1—Ph3—F | 8 | 4-Cy-Cy-Ph—OCFFF | 4 |
| 2-Ph—Ph3—CFFO—Ph3—F | 4 | 3-Cy-Cy-CFFO—Ph3—F | 7 |
| 3-Ph—Ph3—CFFO—Ph3—F | 6 | 5-Cy-Cy-CFFO—Ph3—F | 4 |
| Tni/° C. | 100.7 | 3-Cy-Cy-Ph1—Ph3—F | 2 |
| Δn | 0.094 | Tni/° C. | 103.2 |
| Δε | 8.0 | Δn | 0.102 |
| γ1/mPa · s | 108 | Δε | 7.1 |

TABLE 4-continued

| Liquid crystal composition 2 | | Liquid crystal composition 3 | |
|---|---|---|---|
| Compound name | Content (%) | Compound name | Content (%) |
| $\eta$/mPa · s | 22.2 | $\gamma1$/mPa · s | 96 |
| | | $\eta$/mPa · s | 20.8 |

TABLE 5

| | Example 2 | Example 3 |
|---|---|---|
| Liquid crystal composition | Liquid crystal composition 2 | Liquid crystal composition 3 |
| VHR | 99.5 | 99.5 |
| ID | 17 | 18 |
| Image-sticking | A | A |
| Maximum transmittance | 88.9% | |

The liquid crystal display devices of Examples 2 and 3 had high VHRs and low IDs. The liquid crystal display device of Example 2 also had a high transmittance. These liquid crystal display devices also exhibited no or only slight and acceptable image-sticking.

Examples 4 to 6

Liquid Crystal Compositions 4 to 6 shown in the following tables were injected as in Example 1 to obtain liquid crystal display devices of Examples 4 to 6. The resulting liquid crystal display devices were tested for VHR and ID and were evaluated for image-sticking. The liquid crystal display device of Example 4 was also tested for transmittance. The results are summarized in the following tables.

TABLE 6

| Liquid crystal composition 4 | | Liquid crystal composition 5 | | Liquid crystal composition 6 | |
|---|---|---|---|---|---|
| Compound name | Content (%) | Compound name | Content (%) | Compound name | Content (%) |
| 5-Cy-Cy-1d0 | 15 | 5-Cy-Cy-1d0 | 10 | 5-Cy-Cy-1d0 | 12 |
| 3-Cy-Cy-1d1 | 2 | 3-Cy-Cy-1d1 | 5 | 3-Cy-Cy-1d1 | 25 |
| 0d1-Cy-Cy-Ph-1 | 12 | 0d1-Cy-Cy-Ph-1 | 8 | 3-Cy-Cy-1d1 | 12 |
| 2-Ph—Ph1—Ph-3 | 3 | 0d3-Cy-Cy-Ph-1 | 12 | 0d1-Cy-Cy-Ph-1 | 4 |
| 2-Ph—Ph1—Ph-4 | 3 | 2-Ph—Ph1—Ph-5 | 2 | 0d3-Cy-Cy-Ph-1 | 9 |
| 2-Cy-Cy-Ph3—F | 8 | 3-Cy-Ph—Ph-Cy-3 | 3 | 2-Ph—Ph1—Ph3—F | 5 |
| 2-Cy-Ph—Ph3—F | 3 | 3-Cy-Ph—Ph1-Cy-3 | 3 | 3-Ph—Ph1—Ph3—F | 9 |
| 3-Cy-Ph—Ph3—F | 9 | 1-Cy-Cy-Ph3—F | 9 | 2-Ph—Ph3—CFFO—Ph3—F | 4 |
| 4-Cy-Cy-Ph—OCFFF | 14 | 2-Cy-Cy-Ph3—F | 10 | 3-Ph—Ph3—CFFO—Ph3—F | 6 |
| 3-Ph—Ph3—CFFO—Ph3—F | 11 | 3-Cy-Cy-Ph3—F | 6 | 3-Cy-Cy-CFFO—Ph3—F | 2 |
| 2-Cy-Cy-CFFO—Ph3—F | 9 | 5-Cy-Cy-Ph3—F | 5 | 5-Cy-Cy-CFFO—Ph3—F | 3 |
| 3-Cy-Cy-CFFO—Ph3—F | 8 | 0d1-Cy-Cy-Ph1—F | 8 | 3-Cy-Cy-Ph1—Ph3—F | 9 |
| 3-Cy-Cy-Ph1—Ph3—F | 3 | 2-Ph—Ph3—CFFO—Ph3—F | 4 | Tni/° C. | 77.4 |
| Tni/° C. | 90.2 | 3-Ph—Ph3—CFFO—Ph3—F | 6 | $\Delta n$ | 0.101 |
| $\Delta n$ | 0.098 | 3-Cy-Cy-Ph1—Ph3—F | 9 | $\Delta\epsilon$ | 7.0 |
| $\Delta\epsilon$ | 9.1 | Tni/° C. | 110.0 | $\gamma1$/mPa · s | 86 |
| $\gamma1$/mPa · s | 90 | $\Delta n$ | 0.099 | $\eta$/mPa · s | 14.2 |
| $\eta$/mPa · s | 18.1 | $\Delta\epsilon$ | 8.3 | | |
| | | $\gamma1$/mPa · s | 112 | | |
| | | $\eta$/mPa · s | 23.4 | | |

TABLE 7

|  | Example 4 | Example 5 | Example 6 |
|---|---|---|---|
| Liquid crystal composition | Liquid crystal composition 4 | Liquid crystal composition 5 | Liquid crystal composition 6 |
| VHR | 99.6 | 99.4 | 99.5 |
| ID | 13 | 27 | 19 |
| Image-sticking | A | A | A |
| Maximum transmittance | 89.0% | | |

The liquid crystal display devices of Examples 4 to 6 had high VHRs and low IDs. The liquid crystal display device of Example 4 also had a high transmittance. These liquid crystal display devices also exhibited no or only slight and acceptable image-sticking.

Examples 7 to 9

Electrode structures were formed on first and second substrates. Horizontal alignment layers were formed on the opposing surfaces of the first and second substrates and were subjected to weak rubbing. TN cells were assembled, and Liquid Crystal Compositions 7 to 9 shown in the following tables were injected between the first and second substrates ($d_{gap}$=3.5 μm, alignment layer: SE-7492). The resulting liquid crystal display devices were tested for VHR and ID and were evaluated for image-sticking. The results are summarized in the following tables.

TABLE 8

| Liquid crystal composition 7 | | Liquid crystal composition 8 | | Liquid crystal composition 9 | |
|---|---|---|---|---|---|
| Compound name | Content (%) | Compound name | Content (%) | Compound name | Content (%) |
| 3-Cy-Cy-1d0 | 38 | 3-Cy-Cy-1d0 | 38 | 3-Cy-Cy-1d0 | 30 |
| 3-Cy-Cy-1d1 | 9 | 3-Cy-Cy-1d1 | 14 | 3-Cy-Cy-1d1 | 17 |
| 0d1-Cy-Cy-Ph-1 | 16 | 0d3-Cy-Cy-Ph-1 | 8 | 0d1-Cy-Cy-Ph-1 | 7 |
| 0d3-Cy-Cy-Ph-1 | 4 | 3-Ph—Ph3—CFFO—Ph3—F | 9 | 0d3-Cy-Cy-Ph-1 | 7 |
| 2-Ph—Ph3—CFFO—Ph3—F | 2 | 3-Cy-Cy-CFFO—Ph3—F | 15 | 3-Cy-Cy-Ph-2 | 2 |
| 3-Ph—Ph3—CFFO—Ph3—F | 12 | 3-Ph—Ph1—Ph3—CFFO—Ph3—F | 2 | 2-Ph—Ph1—Ph-4 | 2 |
| 3-Cy-Cy-CFFO—Ph3—F | 7 | 4-Ph—Ph1—Ph3—CFFO—Ph3—F | 7 | 2-Ph—Ph1—Ph3—F | 8 |
| 3-Ph—Ph—Ph1—Ph3—F | 1 | 5-Ph—Ph1—Ph3—CFFO—Ph3—F | 7 | 3-Ph—Ph1—Ph3—F | 12 |
| 3-Ph—Ph1—Ph3—CFFO—Ph3—F | 2 | Tni/° C. | 81.8 | 3-Ph—Ph3—Ph3—F | 4 |
| 2-Py—Ph—Ph3—CFFO—Ph3—F | 9 | Δn | 0.099 | 3-Cy-Cy-Ph1—CFFO—Ph3—F | 11 |
| Tni/° C. | 76.0 | Δε | 8.0 | Tni/° C. | 75.0 |
| Δn | 0.097 | γ1/mPa · s | 83 | Δn | 0.112 |
| Δε | 6.8 | η/mPa · s | 14.6 | Δε | 8.7 |
| γ1/mPa · s | 83 | | | γ1/mPa · s | 87 |
| η/mPa · s | 14.5 | | | η/mPa · s | 15.2 |

TABLE 9

|  | Example 7 | Example 8 | Example 9 |
|---|---|---|---|
| Liquid crystal composition | Liquid crystal composition 7 | Liquid crystal composition 8 | Liquid crystal composition 9 |
| VHR | 99.6 | 99.7 | 99.5 |
| ID | 15 | 13 | 22 |
| Image-sticking | A | A | A |

The liquid crystal display devices of Examples 7 to 9 had high VHRs and low IDs. These liquid crystal display devices also exhibited no or only slight and acceptable image-sticking.

Examples 10 and 11

An electrode structure was formed on at least one of first and second substrates. Horizontal alignment layers were formed on the opposing surfaces of the first and second substrates and were subjected to weak rubbing. FFS cells were assembled, and Liquid Crystal Compositions 10 and 11 shown in the following tables were injected between the first and second substrates ($d_{gap}$=4.0 μm, alignment layer: AL-1051). The resulting liquid crystal display devices were tested for VHR and ID and were evaluated for image-sticking. The results are summarized in the following tables.

TABLE 10

| Liquid crystal composition 10 | | Liquid crystal composition 11 | |
|---|---|---|---|
| Compound name | Content (%) | Compound name | Content (%) |
| 3-Cy-Cy-1d0 | 39 | 3-Cy-Cy-1d0 | 44 |
| 3-Cy-Cy-1d1 | 7 | 3-Cy-Cy-1d1 | 3 |
| 0d1-Cy-Cy-Ph-1 | 11 | 2-Ph—Ph-3d1 | 13 |
| 2-Ph—Ph1—Ph-3 | 8 | 3-Cy-Ph—Ph-2 | 7 |
| 2-Ph—Ph1—Ph-5 | 8 | 2-Ph—Ph1—Ph-3 | 8 |
| 3-Ph—Ph3—CFFO—Ph3—F | 10 | 3-Ph—Ph1—Ph-3 | 7 |
| 3-Cy-Cy-Ph—Ph3—F | 6 | 3-Ph—Ph1—Ph3—CFFO—Ph3—F | 9 |
| 4-Ph—Ph1—Ph3—CFFO—Ph3—F | 11 | 4-Cy-Cy-Ph1—CFFO—Ph3—F | 3 |
| Tni/° C. | 76.0 | 3-Cy-Ph3—Ph1—OCFFF | 6 |
| Δn | 0.114 | Tni/° C. | 77.9 |
| Δ∈ | 6.0 | Δn | 0.131 |
| γ1/mPa · s | 77 | Δ∈ | 4.6 |
| η/mPa · s | 13.3 | γ1/mPa · s | 74 |
| | | η/mPa · s | 12.4 |

TABLE 11

| | Example 10 | Example 11 |
|---|---|---|
| Liquid crystal composition | Liquid crystal composition 10 | Liquid crystal composition 11 |
| VHR | 99.5 | 99.6 |
| ID | 23 | 16 |
| Image-sticking | A | A |

The liquid crystal display devices of Examples 10 and 11 had high VHRs and low IDs. These liquid crystal display devices also exhibited no or only slight and acceptable image-sticking.

Examples 12 to 14

Liquid Crystal Compositions 12 to 14 were injected as in Example 10 to obtain liquid crystal display devices of Examples 12 to 14. The resulting liquid crystal display devices were tested for VHR and ID and were evaluated for image-sticking. The results are summarized in the following tables.

TABLE 12

| Liquid crystal composition 12 | | Liquid crystal composition 13 | | Liquid crystal composition 14 | |
|---|---|---|---|---|---|
| Compound name | Content (%) | Compound name | Content (%) | Compound name | Content (%) |
| 3-Cy-Cy-1d0 | 47 | 3-Cy-Cy-1d0 | 29 | 3-Cy-Cy-1d0 | 10 |
| 3-Cy-Cy-1d1 | 9 | 5-Cy-Cy-1d1 | 8 | 3-Cy-Cy-1d1 | 6 |
| 3-Cy-Cy-Ph-2 | 7 | 3-Cy-Cy-1d1 | 13 | 3-Cy-Cy-1d1-F | 28 |
| 2-Ph—Ph1—Ph-3 | 4 | 5-Ph—Ph-1 | 2 | 0d1-Cy-Cy-Ph-1 | 11 |
| 2-Ph—Ph1—Ph-5 | 7 | 2-Ph—Ph1—Ph-3 | 6 | 0d3-Cy-Cy-Ph-1 | 10 |
| 3-Cy-Ph—Ph-Cy-3 | 2 | 2-Ph—Ph1—Ph-4 | 6 | 2-Ph—Ph1—Ph-3 | 10 |
| 2-Ph—Ph1—Ph-3 | 6 | 2-Ph—Ph1—Ph-5 | 6 | 2-Ph—Ph1—Ph-5 | 10 |
| 3-Ph—Ph1—Ph-3 | 7 | 3-Cy-Ph—Ph-Cy-3 | 4 | 5-Cy-Ph—Ph1—Ph-2 | 2 |
| 3-Ph—Ph3—CFFO—Ph3—F | 2 | 3-Ph—Ph1—Ph3—F | 9 | 3-Ph—Ph3—CFFO—Ph3—F | 7 |
| 3-Cy-Cy-Ph1—Ph3—F | 2 | 2-Ph—Ph3—Ph3—F | 7 | 3-Cy-Cy-Ph1—CFFO—Ph3—F | 6 |
| 3-Cy-Ph—Ph3—Ph1—OCFFF | 7 | 3-Ph—Ph3—CFFO—Ph3—F | 4 | Tni/° C. | 80.0 |
| Tni/° C. | 80.6 | 3-Cy-Ph—Cl | 3 | Δn | 0.110 |
| Δn | 0.122 | 3-Cy-Cy-Ph1—Ph3—F | 3 | Δ∈ | 5.9 |
| Δ∈ | 6.0 | Tni/° C. | 74.9 | γ1/mPa · s | 68 |
| γ1/mPa · s | 65 | Δn | 0.121 | η/mPa · s | 11.6 |
| η/mPa · s | 11.1 | Δ∈ | 4.1 | | |
| | | γ1/mPa · s | 60 | | |
| | | η/mPa · s | 10.8 | | |

TABLE 13

|  | Example 12 | Example 13 | Example 14 |
|---|---|---|---|
| Liquid crystal composition | Liquid crystal composition 12 | Liquid crystal composition 13 | Liquid crystal composition 14 |
| VHR | 99.7 | 99.5 | 99.6 |
| ID | 14 | 22 | 14 |
| Image-sticking | A | A | A |

The liquid crystal display devices of Examples 12 to 14 had high VHRs and low IDs. These liquid crystal display devices also exhibited no or only slight and acceptable image-sticking.

Example 15

Liquid Crystal Composition 10 used in Example 10 was mixed with 0.3% by mass of biphenyl-4,4'-diyl bismethacrylate to obtain Liquid Crystal Composition 15. Liquid Crystal Composition 15 was injected into a TN cell and was polymerized by exposing the liquid crystal composition to ultraviolet radiation for 600 seconds (3.0 J/cm$^2$) while applying a drive voltage across the electrodes to obtain a liquid crystal display device of Example 15. The resulting liquid crystal display device was tested for VHR and ID and was evaluated for image-sticking. The results are summarized in the following table.

TABLE 14

|  | Example 15 |
|---|---|
| Liquid crystal composition | Liquid crystal composition 15 |
| VHR | 99.5 |
| ID | 20 |
| Image-stbking | A |

The liquid crystal display device of Example 15 had a high VHR and a low ID. This liquid crystal display device also exhibited no or only slight and acceptable image-sticking.

Example 16

Liquid Crystal Composition 8 used in Example 8 was mixed with 0.3% by mass of biphenyl-4,4'-diyl bismethacrylate to obtain Liquid Crystal Composition 16. Liquid Crystal Composition 16 was infected into an IPS cell and was polymerized by exposing the liquid crystal composition to ultraviolet radiation for 600 seconds (3.0 J/cm$^2$) while applying a chive voltage across the electrodes to obtain a liquid crystal display device of Example 16. The resulting liquid crystal display device was tested for VHR and ID and was evaluated for image-sticking. The results are summarized in the following table.

TABLE 15

|  | Example 16 |
|---|---|
| Liquid crystal composition | Liquid crystal composition 16 |
| VHR | 99.4 |
| ID | 31 |
| Image-sticking | A |

The liquid crystal display device of Example 16 had a high VHR and a low ID. This liquid crystal display device also exhibited no or only slight and acceptable image-sticking.

Example 17

Liquid Crystal Composition 6 used in Example 6 was mixed with 0.3% by mass of 3-fluorobiphenyl-4,4'-diyl bismethacrylate to obtain Liquid Crystal Composition 17. Liquid Crystal Composition 17 was injected into an FFS cell and was polymerized by exposing the liquid crystal composition to ultraviolet radiation for 600 seconds (3.0 J/cm$^2$) while applying a drive voltage across the electrodes to obtain a liquid crystal display device of Example 17. The resulting liquid crystal display device was tested for VHR and ID and was evaluated for image-sticking. The results are summarized in the following table.

TABLE 16

|  | Example 17 |
|---|---|
| Liquid crystal composition | Liquid crystal composition 17 |
| VHR | 99.6 |
| ID | 15 |
| Image-sticking | A |

The liquid crystal display device of Example 17 had a high VHR and a low ID. This liquid crystal display device also exhibited no or only slight and acceptable image-sticking.

Examples 18 and 19

Liquid Crystal Compositions 18 and 19 shown in the following tables were injected as in Example 1 to obtain liquid crystal display devices of Examples 18 and 19. The resulting liquid crystal display devices were tested for VHR and ID and were evaluated for image-sticking. The results are summarized in the following tables.

TABLE 17

| | Liquid crystal composition 18 | | Liquid crystal composition 19 | |
|---|---|---|---|---|
| Compound name | Content (%) | Compound name | | Content (%) |
| 4-Cy-Cy-1d0 | 15 | 2-Cy-Cy-1d0 | | 32 |
| 0d1-Cy-Cy-Ph-1 | 4 | 0d1-Cy-Cy-Ph-1 | | 4 |
| 0d3-Cy-Cy-Ph-1 | 14 | 2-Ph—Ph1—Ph-3 | | 10 |
| 3-Cy-Ph—Ph-Cy-3 | 3 | 2-Ph—Ph1—Ph-5 | | 11 |
| 3-Cy-Ph—Ph1-Cy-3 | 4 | 3-Ph—Ph1—Ph-5 | | 7 |
| 1-Cy-Cy-Ph3—F | 9 | 2-Cy-Cy-Ph—F | | 6 |
| 2-Cy-Cy-Ph3—F | 10 | 3-Cy-Cy-Ph—F | | 21 |
| 3-Cy-Cy-Ph3—F | 10 | 5-Cy-Ph—Ph—F | | 7 |
| 5-Cy-Cy-Ph3—F | 5 | 3-Cy-Ph—Ph3—F | | 2 |
| 3-Cy-Ph1—Ph3—F | 8 | Tni/° C. | | 77.2 |
| 5-Cy-Ph1—Ph3—F | 7 | Δn | | 0.135 |
| 3-Ph—Ph1—Ph3—F | 3 | Δε | | 4.5 |
| 3-Cy-Cy-Ph1—Ph3—F | 8 | γ1/mPa · s | | 57 |
| Tni/° C. | 101.0 | η/mPa · s | | 10.5 |
| Δn | 0.095 | | | |
| Δε | 6.2 | | | |
| γ1/mPa · s | 115 | | | |
| η/mPa · s | 23.6 | | | |

TABLE 18

|  | Example 18 | Example 19 |
|---|---|---|
| Liquid crystal composition | Liquid crystal composition 18 | Liquid crystal composition 19 |

TABLE 18-continued

|  | Example 18 | Example 19 |
|---|---|---|
| VHR | 98.4 | 98.5 |
| ID | 75 | 67 |
| Image-sticking | B | B |

Although the liquid crystal display devices of Examples 18 and 19 had rather high IDs, they exhibited only slight and acceptable image-sticking.

Examples 20 to 22

Liquid Crystal Compositions 20 to 22 shown in the following tables were injected as in Example 1 to obtain liquid crystal display devices of Examples 20 to 22. The resulting liquid crystal display devices were tested for VHR and ID and were evaluated for image-sticking. The results are summarized in the following tables.

TABLE 19

| Liquid crystal composition 20 | | Liquid crystal composition 21 | | Liquid crystal composition 22 | |
|---|---|---|---|---|---|
| Compound name | Content (%) | Compound name | Content (%) | Compound name | Content (%) |
| 4-Cy-Cy-1d0 | 18 | 4-Cy-Cy-1d0 | 18 | 4-Cy-Cy-1d0 | 17 |
| 3-Cy-Cy4 | 15 | 3-Cy-Cy-4 | 15 | 3-Cy-Cy-4 | 15 |
| 0d1-Cy-Cy-Ph-1 | 8 | 0d1-Cy-Cy-Ph-1 | 8 | 0d3-Cy-Cy-Ph-1 | 8 |
| 2-Ph—Ph1—Ph-3 | 10 | 2-Ph—Ph1—Ph-3 | 10 | 3-Cy-Ph—Ph-2 | 10 |
| 2-Ph—Ph1—Ph-5 | 6 | 2-Ph—Ph1—Ph-5 | 6 | 2-Ph—Ph1—Ph-5 | 7 |
| 3-Ph—Ph1—Ph-5 | 6 | 3-Ph—Ph1—Ph-5 | 5 | 3-Ph—Ph1—Ph-5 | 7 |
| 2-Cy-Cy-Ph—F | 6 | 2-Cy-Cy-Ph—F | 6 | 2-Cy-Cy-Ph—F | 6 |
| 3-Cy-Cy-Ph—F | 10 | 3-Cy-Cy-Ph—F | 5 | 3-Cy-Cy-Ph—F | 5 |
| 5-Cy-Ph—Ph—F | 7 | 5-Cy-Ph—Ph—F | 7 | 5-Cy-Ph—Ph—F | 7 |
| 3-Cy-Ph—Ph3—F | 14 | 3-Cy-Ph—Ph3—F | 15 | 3-Cy-Ph—Ph3—F | 14 |
| $T_{ni}/°C.$ | 73.5 | 3-Cy-Cy-Ph1—Ph3—F | 5 | 3-Cy-Cy-Ph1—Ph3—F | 4 |
| $\Delta n$ | 0.126 | $T_{ni}/°C.$ | 75.7 | $T_{ni}/°C.$ | 85.3 |
| $\Delta\epsilon$ | 4.9 | $\Delta n$ | 0.125 | $\Delta n$ | 0.128 |
| $\gamma 1/mPa \cdot s$ | 94 | $\Delta\epsilon$ | 5.5 | $\Delta\epsilon$ | 4.8 |
| $\eta/mPa \cdot s$ | 16.9 | $\gamma 1/mPa \cdot s$ | 103 | $\gamma 1/mPa \cdot s$ | 107 |
|  |  | $\eta/mPa \cdot s$ | 18.4 | $\eta/mPa \cdot s$ | 19.0 |

TABLE 20

|  | Example 20 | Example 21 | Example 22 |
|---|---|---|---|
| Liquid crystal composition | Liquid crystal composition 20 | Liquid crystal composition 21 | Liquid crystal composition 22 |
| VHR | 98.3 | 98.4 | 98.5 |
| ID | 78 | 72 | 65 |
| Image-sticking | B | B | B |

Although the liquid crystal display devices of Examples 20 to 22 had rather high IDs, they exhibited only slight and acceptable image-sticking.

Examples 23 and 24

Liquid Crystal Compositions 23 and 24 shown in the following tables were injected as in Example 1 to obtain liquid crystal display devices of Examples 23 and 24. The resulting liquid crystal display devices were tested for VHR and ID and were evaluated for image-sticking. The results are summarized in the following tables.

TABLE 21

| Liquid crystal composition 23 | |
|---|---|
| Compound name | Content (%) |
| 3-Cy-Cy-1d0 | 44 |
| 3-Cy-Cy-1d1 | 8 |
| 1-Ph—Ph-3d1 | 3 |
| 2-Ph—Ph1—Ph3—F | 4 |
| 2-Py—Ph—Ph3—CFFO—Ph3—F | 6 |
| 3-Py—Ph—Ph3—CFFO—Ph3—F | 5 |
| 0d1-Cy-Cy-Ph-1 | 15 |
| 3-Cy-Ph—Ph-2 | 4 |
| 2-Ph—Ph1—Ph-4 | 4 |
| 3-Ph—Ph3—CFFO—Ph3—F | 7 |

TABLE 21-continued

| Liquid crystal composition 23 | |
|---|---|
| Compound name | Content (%) |
| $T_{NI}/°C.$ | 76.8 |
| $\Delta n$ | 0.102 |
| $\Delta\epsilon$ | 4.9 |
| $\eta/mPa \cdot s$ | 15 |
| $\gamma_1/mPa \cdot s$ | 39 |

TABLE 22

| Liquid Crystal Composition 24 | |
|---|---|
| Compound name | Content (%) |
| 3-Ph—Ph3—CFFO—Ph3—F | 4 |
| 3-Cy-Cy-1d0 | 14 |
| 3-Cy-Cy-1d1 | 34 |
| 0d1-Cy-Cy-Ph-1 | 15 |
| 4-Ph—Ph1—Ph3—CFFO—Ph3—F | 8 |
| 5-Ph—Ph1—Ph3—CFFO—Ph3—F | 7 |
| 3-Py—Ph—Ph3—CFFO—Ph3—F | 7 |
| 2-Py—Ph—Ph3—CFFO—Ph3—F | 4 |
| 3-Cy-Cy-Ph—OCFFF | 6 |

TABLE 22-continued

| Liquid Crystal Composition 24 | |
|---|---|
| Compound name | Content (%) |
| 0d3-Ph—Ph1—Ph-2 | 1 |
| $T_{NI}/°$ C. | 76.8 |
| $\Delta n$ | 0.102 |
| $\Delta \in$ | 4.9 |
| $\eta$/mPa · s | 15 |
| $\gamma_1$/mPa · s | 39 |

TABLE 23

| Liquid crystal composition | Example 23 | Example 24 |
|---|---|---|
| | Liquid crystal composition 23 | Liquid crystal composition 24 |

TABLE 23-continued

| | Example 23 | Example 24 |
|---|---|---|
| VHR | 98.3 | 99.6 |
| ID | 75 | 69 |
| Image-sticking | B | B |

Comparative Examples 1

Comparative Liquid Crystal Composition 1 shown below was injected into an IPS cell as used in Example 1 to obtain a liquid crystal display device of Comparative Example 1. The resulting liquid crystal display device was tested for VHR, ID, and transmittance and was evaluated for image-sticking. The following tables summarize the physical properties of the comparative liquid crystal composition and the results for the VHR, ID, and transmittance of the liquid crystal display device.

[Chem. 45]

| Chemical structure | Content | Abbreviation |
|---|---|---|
| $C_4H_9$—Cy—COO—Ph—$CH_3$ | 27% | 4-Cy—VO—Ph-1 |
| $C_5H_{11}$—Cy—COO—Ph—$CH_3$ | 20% | 5-Cy—VO—Ph-1 |
| $C_5H_{11}$—Cy—COO—Ph—$C_3H_7$ | 20% | 5-Cy—VO—Ph-3 |
| $C_3H_7$—Ph—Ph3—$CF_2O$—Ph3—F | 8% | 3-Ph—Ph3—CFFO—Ph3—F |
| $C_3H_7$—Cy—Cy—$CF_2O$—Ph3—F | 13% | 3-Cy—Cy—CFFO—Ph3—F |
| $C_3H_7$—Ph—Ph1—Ph3—$CF_2O$—Ph3—F | 12% | 3-Ph—Ph1—Ph3—CFFO—Ph3—F |

TABLE 24

| | |
|---|---|
| $T_{NI}/°$ C. | 69.3 |
| $\Delta n$ | 0.096 |
| no | 1.484 |
| $\in_\perp$ | 5.5 |
| $\Delta \in$ | 4.8 |
| $\eta$/mPa · s | 30.3 |

TABLE 25

| | Comparative Example 1 |
|---|---|
| Liquid crystal composition | Comparative Liquid Crystal Composition 1 |
| VHR | 98.2 |
| ID | 162 |

TABLE 25-continued

|  | Comparative Example 1 |
|---|---|
| Image-sticking | D |
| Maximum transmittance | 88.80% |

The liquid crystal display device of Comparative Example 1 had a lower VHR and a higher ID than the liquid crystal display devices according to the present invention and also exhibited unacceptable image-sticking.

Comparative Examples 2 and 3

Comparative Liquid Crystal Compositions 2 and 3 shown in the following tables were injected as in Example 1 to obtain liquid crystal display devices of Comparative Examples 2 and 3. The resulting liquid crystal display devices were tested for VHR and ID and were evaluated for image-sticking. The results are summarized in the following tables.

TABLE 26

| Comparative Liquid Crystal Composition 2 | | Comparative Liquid Crystal Composition 3 | |
|---|---|---|---|
| Compound name | Content (%) | Compound name | Content (%) |
| 2-Cy-Cy-Ph3—F | 12 | 2-Cy-Cy-Ph3—F | 12 |
| 3-Cy-Cy-Ph3—F | 10 | 3-Cy-Cy-Ph3—F | 10 |
| 5-Cy-Cy-Ph3—F | 6 | 2-Cy-Cy-Ph—OCFFF | 8 |
| 2-Cy-Cy-Ph—OCFFF | 9 | 3-Cy-Cy-Ph—OCFFF | 8 |
| 3-Cy-Cy-Ph—OCFFF | 8 | 4-Cy-Cy-Ph—OCFFF | 7 |
| 4-Cy-Cy-Ph—OCFFF | 7 | 5-Cy-Cy-Ph—OCFFF | 4 |
| 2-Cy-Ph1—Ph3—F | 12 | 2-Cy-Ph1—Ph3—F | 12 |
| 3-Cy-Ph1—Ph3—F | 10 | 3-Cy-Ph1—Ph3—F | 4 |
| 2-Cy-Py-Cy-CFFO—Ph3—F | 5.5 | 2-Cy-Cy-CFFO—Ph3—F | 12 |
| 2-Ph—Ph1—Ph3—F | 5.5 | 2-Ph—Ph1—Ph3—F | 8 |
| 0d1-Cy-Cy-CFFO—Ph3—F | 15 | 0d1-Cy-Cy-CFFO—Ph3—F | 15 |
| Tni/° C. | 75.7 | Tni/° C. | 75.0 |
| Δn | 0.093 | Δn | 0.093 |
| γ1/mPa · s | 146 | γ1/mPa · s | 139 |

TABLE 27

|  | Comparative Example 2 | Comparative Example 3 |
|---|---|---|
| Liquid crystal composition | Comparative Liquid Crystal Composition 2 | Comparative Liquid Crystal Composition 3 |
| VHR | 98.3 | 98.4 |
| ID | 152 | 141 |
| Image-sticking | D | C |

The liquid crystal display devices of Comparative Examples 2 and 3 had lower VHRs and higher IDs than the liquid crystal display devices according to the present invention and also exhibited unacceptable image-sticking.

Comparative Examples 4 to 6

Comparative Liquid Crystal Compositions 4 to 6 shown in the following tables were injected as in Example 1 to obtain liquid crystal display devices of Comparative Examples 4 to 6. The resulting liquid crystal display devices were tested for VHR and ID and were evaluated for image-sticking. The results are summarized in the following tables.

TABLE 28

| Comparative Liquid Crystal Composition 4 | | Comparative Liquid Crystal Composition 5 | | Comparative Liquid Crystal Composition 6 | |
|---|---|---|---|---|---|
| Compound name | Content (%) | Compound name | Content (%) | Compound name | Content (%) |
| 2-Cy-Cy-Ph3—F | 10 | 2-Cy-Cy-Ph3—F | 10 | 2-Cy-Cy-Ph3—F | 10 |
| 0d1-Cy-Cy-Ph1—F | 8 | 0d1-Cy-Cy-Ph1—F | 8 | 0d1-Cy-Cy-Ph1—F | 8 |
| 2-Ph—Ph3—CFFO—Ph3—F | 4 | 2-Ph—Ph3—CFFO—Ph3—F | 4 | 3-Cy-Cy-Ph3—F | 10 |
| 3-Cy-Cy-Ph3—F | 10 | 3-Cy-Cy-Ph3—F | 10 | 2-Ph—Ph3—CFFO—Ph3—F | 6 |
| 2-Ph—Ph3—CFFO—Ph3—F | 6 | 2-Ph—Ph3—CFFO—Ph3—F | 6 | 3-Cy-Cy-Ph1—Ph3—F | 8 |
| 3-Cy-Cy-Ph1—Ph3—F | 8 | 3-Cy-Cy-Ph1—Ph3—F | 8 | 5-Cy-Cy-Ph3—F | 5 |
| 1-Cy-Cy-Ph3—F | 9 | 1-Cy-Cy-Ph3—F | 9 | 0d3-Ph-T-Ph-3d0 | 10 |
| 5-Cy-Cy-Ph3—F | 5 | 5-Cy-Cy-Ph3—F | 5 | 3-Cy-Ph3-T-Ph9-1 | 4 |

TABLE 28-continued

| Comparative Liquid Crystal Composition 4 | | Comparative Liquid Crystal Composition 5 | | Comparative Liquid Crystal Composition 6 | |
|---|---|---|---|---|---|
| Compound name | Content (%) | Compound name | Content (%) | Compound name | Content (%) |
| 0d3-Ph-T-Ph-3d0 | 15 | 0d3-Ph-T-Ph-3d0 | 10 | 3-Cy-Cy-CFFO—Ph3—F | 4 |
| 3-Cy-Ph-T-Ph-2 | 14 | 3-Cy-Ph3-T-Ph9-1 | 4 | 4-Ph-T-Ph—O2 | 4 |
| 0d3-Ph—N—Ph-3d0 | 4 | 4-Ph-T-Ph—O2 | 4 | 5-Cy-Cy-CFFO—Ph3—F | 9 |
| 3-Ph—VO-Cy-VO—Ph-3 | 4 | 3-Cy-Ph-T-Ph-2 | 7 | 5-Cy-VO—Ph-1 | 5 |
| 3-Cy-Cy-VO—Ph-Cy-3 | 3 | 5-Cy-VO—Ph-1 | 5 | 0d3-Ph—N—Ph-3d0 | 7 |
| Tni/° C. | 101.6 | 3-Ph—VO-Cy-VO—Ph-3 | 7 | 3-Ph—VO-Cy-VO—Ph-3 | 7 |
| Δn | 0.153 | 3-Cy-Cy-VO—Ph-Cy-3 | 3 | 3-Cy-Cy-VO—Ph-Cy-3 | 3 |
| Δ∈ | 9.2 | Tni/° C. | 96.4 | Tni/° C. | 99.2 |
| γ1/mPa · s | 101 | Δn | 0.137 | Δn | 0.136 |
| η/mPa · s | 23.7 | Δ∈ | 8.8 | Δ∈ | 7.8 |
| | | γ1/mPa · s | 90 | γ1/mPa · s | 105 |
| | | η/mPa · s | 25.9 | η/mPa · s | 26.6 |

TABLE 29

| | Comparative Example 4 | Comparative Example 5 | Comparative Example 6 |
|---|---|---|---|
| Liquid crystal composition | Comparative Liquid Crystal Composition 4 | Comparative Liquid Crystal Composition 5 | Comparative Liquid Crystal Composition 6 |
| VHR | 98.3 | 98.5 | 98.4 |
| ID | 151 | 129 | 145 |
| Image-sticking | D | D | C |

The liquid crystal display devices of Comparative Examples 4 to 6 had lower VHRs and higher IDs than the liquid crystal display devices according to the present invention and also exhibited unacceptable image-sticking.

Comparative Examples 7 to 14

The procedures of Examples 2, 4, 5, 7, 10, 12, 16, and 17 were repeated except that the In—Ga—Zn oxide film was replaced with an amorphous silicon film to obtain liquid crystal display devices of Comparative Examples 7 to 14. The resulting liquid crystal display devices were tested for VHR and ID and were evaluated for image-sticking. The liquid crystal display devices of Comparative Examples 7 and 8 were also tested for transmittance. The results are summarized in the following tables.

TABLE 30

| | Comparative Example 7 | Comparative Example 8 | Comparative Example 9 | Comparative Example 10 |
|---|---|---|---|---|
| Liquid crystal composition | Liquid crystal composition 2 | Liquid crystal composition 4 | Liquid crystal composition 5 | Liquid crystal composition 7 |
| VHR | 99.5 | 99.6 | 99.5 | 99.5 |
| ID | 18 | 15 | 28 | 17 |
| Image-sticking | A | A | A | A |
| Maximum transmittance | 86.10% | 85.70% | | |

TABLE 31

| | Comparative Example 11 | Comparative Example 12 | Comparative Example 13 | Comparative Example 14 |
|---|---|---|---|---|
| Liquid crystal composition | Liquid crystal composition 10 | Liquid crystal composition 12 | Liquid crystal composition 16 | Liquid crystal composition 17 |
| VHR | 99.4 | 99.5 | 99.3 | 99.5 |
| ID | 25 | 15 | 35 | 17 |
| Image-sticking | A | A | A | A |

The liquid crystal display devices of Comparative Examples 7 to 14 had VHRs and IDs similar to those of the Examples and also exhibited no or only slight and acceptable image-sticking. These liquid crystal display devices, however, had lower transmittances than the liquid crystal display devices of Examples 2 and 4, which had a thin-film transistor layer including an In—Ga—Zn oxide film.

The invention claimed is:

1. A liquid crystal display device comprising:

first and second opposing substrates;

a liquid crystal layer comprising a liquid crystal composition between the first and second substrates;

a plurality of gate lines and data lines arranged in a matrix on the first substrate;

thin-film transistors disposed at intersections of the gate lines and the data lines; and pixel electrodes that are driven by the transistors and that comprise a transparent conductive material, each thin-film transistor comprising a gate electrode, an oxide semiconductor layer disposed over the gate electrode with an insulating layer therebetween, and source and drain electrodes electrically connected to the oxide semiconductor layer, wherein formula (LC-I) is expressed as

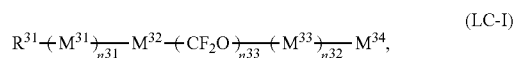

(LC-I)

in which $R^{31}$ is an alkyl group of 1 to 10 carbon atoms, an alkoxy group of 1 to 10 carbon atoms, an alkenyl group of 2 to 10 carbon atoms, or an alkenyloxy group of 2 to 10 carbon atoms, each of $M^{31}$ to $M^{33}$ represents one of following structures,

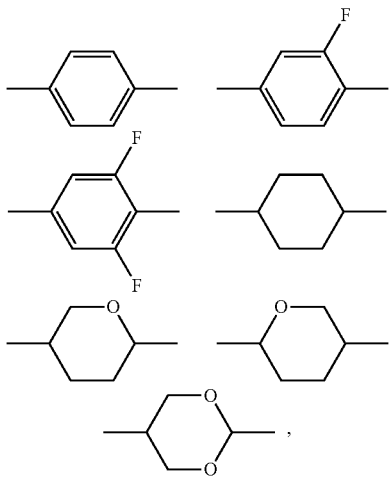

$M^{34}$ represents

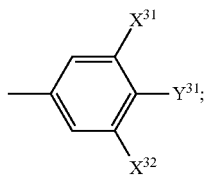

in which $X^{31}$ and $X^{32}$ are each independently hydrogen or fluorine, and $Y^{31}$ is fluorine, chlorine, cyano, —$CF_3$, —$OCH_2F$, —$OCHF_2$, or —$OCF_3$, $n^{31}$ and $n^{32}$ are each independently 0, 1, or 2, with the proviso that $n^{31}+n^{32}$ is 0, 1, or 2, wherein each occurrence of $M^{31}$ and $M^{33}$, if present, may be the same or different, and $n^{33}$ is 0 or 1, wherein the liquid crystal composition comprises:

at least one compound selected from the group consisting of compounds represented by general formula (LC-I) in which $n^{33}$ is 1;

at least one compound selected from the group consisting of compounds represented by general formula (LC-I) in which $n^{33}$ is 0;

at least one compound selected from the group consisting of compounds represented by general formula (II-b); and optionally at least one compound selected from the group consisting of compounds represented by general formulas (II-a) and (II-c) to (II-f):

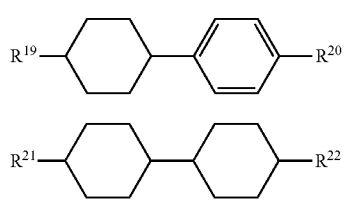

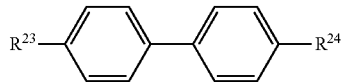

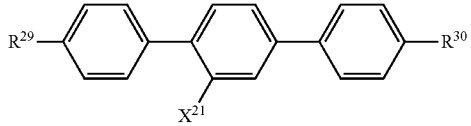

wherein $R^{19}$ to $R^{30}$ are each independently an alkyl group of 1 to 10 carbon atoms, an alkoxy group of 1 to 10 carbon atoms, or an alkenyl group of 2 to 10 carbon atoms; and $X^{21}$ is hydrogen or fluorine, wherein the compounds represented by general formulas (II-a) to (II-f) are included in an amount of 5% to 80% by mass in the liquid crystal composition.

2. The liquid crystal display device according to claim 1, wherein the oxide semiconductor layer comprises an oxide containing at least one element selected from In, Ga, Zn, and Sn.

3. The liquid crystal display device according to claim 1, wherein the oxide semiconductor layer comprises an oxide containing In, Ga, and Zn.

4. The liquid crystal display device according to claim 1, wherein the liquid crystal layer further comprises a compound represented by general formula (LC):

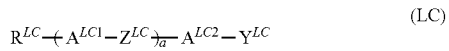

wherein $R^{LC}$ is an alkyl group of 1 to 15 carbon atoms, wherein one or more —$CH_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen;

$A^{LC1}$ and $A^{LC2}$ are each independently a group selected from the group consisting of (a) trans-1,4-cyclohexylene (wherein one or more non-adjacent —$CH_2$— groups present in the group are optionally replaced with oxygen or sulfur), (b) 1,4-phenylene (wherein one or more non-adjacent —CH= groups present in the group are optionally replaced with nitrogen), and (c) 1,4-bicyclo(2.2.2)octylene, naphthalene-2,6-diyl, decahydronaphthalene-2,6-diyl, 1,2,3,4-tetrahydronaphthalene-2,6-diyl, and chromane-2,6-diyl, wherein one or more hydrogen atoms present in groups (a), (b), and (c) are each optionally replaced with fluorine, chlorine, —$CF_3$, or —$OCF_3$;

$Z^{LC}$ is a single bond, —CH=CH—, —CF=CF—, —CH$_2$CH$_2$—, —(CH$_2$)$_4$—, —OCH$_2$—, —CH$_2$O—, —OCF$_2$—, —CF$_2$O—, —COO—, or —OCO—;

$Y^{LC}$ is hydrogen, fluorine, chlorine, cyano, or an alkyl group of 1 to 15 carbon atoms, wherein one or more —CH$_2$— groups in the alkyl group are optionally replaced with —O—, —CH=CH—, —CO—, —OCO—, —COO—, —CF$_2$O—, or —OCF$_2$— such that no oxygen atoms are directly adjacent to each other, and one or more hydrogen atoms in the alkyl group are optionally replaced with halogen; and a is an integer of 1 to 4, wherein if a is 2, 3, or 4, each occurrence of $A^{LC1}$ may be the same or different, and each occurrence of $Z^{LC}$ may be the same or different, with the proviso that compounds represented by general formulas (LC1), (LC2), and (II-a) to (II-f) are excluded.

5. The liquid crystal display device according to claim 1, wherein the liquid crystal layer further comprises a polymer of a liquid crystal composition comprising at least one polymerizable compound selected from the group consisting of:

polymerizable compounds represented by general formula (VI):

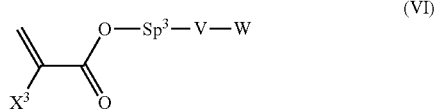

(VI)

wherein $X^3$ is hydrogen or methyl; $Sp^3$ is a single bond, an alkylene group of 1 to 8 carbon atoms, or —O—(CH$_2$)$_t$— (wherein t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other and is optionally substituted with an alkyl group of 5 to 20 carbon atoms (wherein the alkylene group in the group is optionally substituted with oxygen such that no oxygen atoms are adjacent to each other) or a cyclic substituent; and W is hydrogen, halogen, or an alkylene group of 1 to 8 carbon atoms; and polymerizable compounds represented by general formula (V):

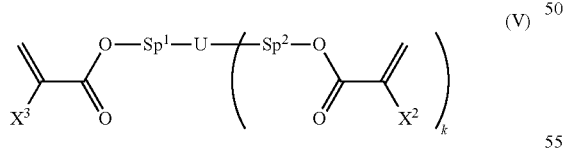

(V)

wherein $X^1$ and $X^2$ are each independently hydrogen or methyl; $Sp^1$ and $Sp^2$ are each independently a single bond, an alkylene group of 1 to 8 carbon atoms, or —O—(CH$_2$)$_s$— (wherein s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other and is optionally substituted with an alkyl group of 5 to 20 carbon atoms (wherein the alkylene group in the group is optionally substituted with oxygen such that no oxygen atoms are adjacent to each other) or a cyclic substituent; and k is an integer of 1 to 5.

6. The liquid crystal display device according to claim 1, further comprising a common electrode comprising a transparent conductive material on the second substrate,
wherein the liquid crystal layer is homogeneously aligned when no voltage is applied.

7. The liquid crystal display device according to any claim 1, further comprising:
common electrodes disposed on the first or second substrate and separated from the pixel electrodes; and
alignment layers that are disposed between the first and second substrates and the liquid crystal layer and in contact with the liquid crystal layer and that induce homogeneous alignment to the liquid crystal composition, the first and second substrates being transparent insulating substrates,
wherein the shortest path from the pixel electrodes to the common electrodes located close to the pixel electrodes comprises a component parallel to the first or second substrate.

8. The liquid crystal display device according to claim 1, further comprising:
common electrodes disposed on the first substrate and separated from the pixel electrodes; and
alignment layers that are disposed between the first and second substrates and the liquid crystal layer and in contact with the liquid crystal layer and that induce homogeneous alignment to the liquid crystal composition,
wherein the shortest distance d between the common electrodes and the pixel electrodes located close to each other is shorter than the shortest distance G between the alignment layers.

9. The liquid crystal display device according to claim 1, wherein the liquid crystal composition consists of:
said at least one compound selected from the group consisting of compounds represented by general formula (LC-I) in which $n^{33}$ is 1;
said at least one compound selected from the group consisting of compounds represented by general formula (LC-I) in which $n^{33}$ is 0;
said at least one compound selected from the group consisting of compounds represented by general formula (II-b);
optionally said at least one compound selected from the group consisting of compounds represented by general formulas (II-a) and (II-c) to (II-f), optionally a compound represented by general formula (LC):

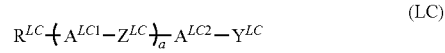

(LC)

wherein
$R^{LC}$ is an alkyl group of 1 to 15 carbon atoms, wherein one or more —CH$_2$— groups in the alkyl group are optionally replaced with —O—, —CH=CH—, —CO—, —OCO—, —COO—, or —C≡C— such that no oxygen atoms are directly adjacent to each other, and one or more hydrogen atoms in the alkyl group are optionally replaced with halogen;
$A^{LC1}$ and $A^{LC2}$ are each independently a group selected from the group consisting of (a) trans-1,4-cyclohexylene (wherein one or more non-adjacent —CH$_2$— groups present in the group are optionally replaced with oxygen or sulfur),
(b) 1,4-phenylene (wherein one or more non-adjacent —CH═ groups present in the group are optionally replaced with nitrogen), and
(c) 1,4-bicyclo(2.2.2)octylene, naphthalene-2,6-diyl, decahydronaphthalene-2,6-diyl, 1,2,3,4-tetrahydronaphthalene-2,6-diyl, and chromane-2,6-diyl, wherein one or more hydrogen atoms present in groups (a), (b), and (c) are each optionally replaced with fluorine, chlorine, —CF$_3$, or —OCF$_3$;

$Z^{LC}$ is a single bond, —CH═CH—, —CF═CF—, —CH$_2$CH$_2$—, —(CH$_2$)$_4$—, —OCH$_2$—, —CH$_2$O—, —OCF$_2$—, —CF$_2$O—, —COO—, or —OCO—;

$Y^{LC}$ is hydrogen, fluorine, chlorine, cyano, or an alkyl group of 1 to 15 carbon atoms, wherein one or more —CH$_2$— groups in the alkyl group are optionally replaced with —O—, —CH═CH—, —CO—, —OCO—, —COO—, —CF$_2$O—, or —OCF$_2$— such that no oxygen atoms are directly adjacent to each other, and one or more hydrogen atoms in the alkyl group are optionally replaced with halogen; and a is an integer of 1 to 4, wherein if a is 2, 3, or 4, each occurrence of $A^{LC1}$ may be the same or different, and each occurrence of $Z^{LC}$ may be the same or different, with the proviso that compounds represented by general formulas (LC-I) and (II-a) to (II-f) are excluded; and optionally at least one polymerizable compound selected from the group consisting of polymerizable compounds represented by general formula (VI) and polymerizable compounds represented by general formula (V):

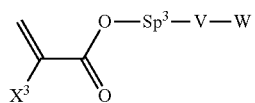
(VI)

wherein X$^3$ is hydrogen or methyl; Sp$^3$ is a single bond, an alkylene group of 1 to 8 carbon atoms, or —O—(CH$_2$)$_t$— (wherein t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other and is optionally substituted with an alkyl group of 5 to 20 carbon atoms (wherein the alkylene group in the group is optionally substituted with oxygen such that no oxygen atoms are adjacent to each other) or a cyclic substituent; and W is hydrogen, halogen, or an alkylene group of 1 to 8 carbon atoms; and

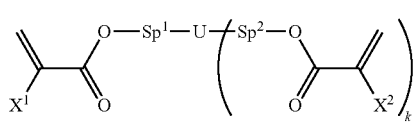
(V)

wherein X$^1$ and X$^2$ are each independently hydrogen or methyl; Sp$^1$ and Sp$^2$ are each independently a single bond, an alkylene group of 1 to 8 carbon atoms, or —O—(CH$_2$)$_s$— (wherein s is an integer of 2 to 7, and the oxygen atom is linked to the aromatic ring); U is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other and is optionally substituted with an alkyl group of 5 to 20 carbon atoms (wherein the alkylene group in the group is optionally substituted with oxygen such that no oxygen atoms are adjacent to each other) or a cyclic substituent; and k is an integer of 1 to 5.

10. The liquid crystal display device according to claim 1, wherein the liquid crystal composition consists of:
said at least one compound selected from the group consisting of compounds represented by general formula (LC-I) in which n$^{33}$ is 1;
said at least one compound selected from the group consisting of compounds represented by general formula (LC-I) in which n$^{33}$ is 0;
said at least one compound selected from the group consisting of compounds represented by general formula (II-b);
optionally said at least one compound selected from the group consisting of compounds represented by general formulas (II-a) and (II-c) to (II-f),
optionally a compound represented by general formula (LC):

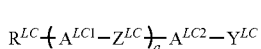
(LC)

wherein
$R^{LC}$ is an alkyl group of 1 to 15 carbon atoms, wherein one or more —CH$_2$— groups in the alkyl group are optionally replaced with —O—, —CH═CH—, —CO—, —OCO—, —COO—, or —C≡C— such that no oxygen atoms are directly adjacent to each other, and one or more hydrogen atoms in the alkyl group are optionally replaced with halogen;

$A^{LC1}$ and $A^{LC2}$ are each independently a group selected from the group consisting of
(a) trans-1,4-cyclohexylene (wherein one or more non-adjacent —CH$_2$— groups present in the group are optionally replaced with oxygen or sulfur),
(b) 1,4-phenylene (wherein one or more non-adjacent —CH═ groups present in the group are optionally replaced with nitrogen), and
(c) 1,4-bicyclo(2.2.2)octylene, naphthalene-2,6-diyl, decahydronaphthalene-2,6-diyl, 1,2,3,4-tetrahydronaphthalene-2,6-diyl, and chromane-2,6-diyl, wherein one or more hydrogen atoms present in groups (a), (b), and (c) are each optionally replaced with fluorine, chlorine, —CF$_3$, or —OCF$_3$;

$Z^{LC}$ is a single bond, —CH═CH—, —CF═CF—, —CH$_2$CH$_2$—, —(CH$_2$)$_4$—, —OCH$_2$—, —CH$_2$O—, —OCF$_2$—, —CF$_2$O—, —COO—, or —OCO—;

$Y^{LC}$ is hydrogen, fluorine, chlorine, cyano, or an alkyl group of 1 to 15 carbon atoms, wherein one or more —CH$_2$— groups in the alkyl group are optionally replaced with —O—, —CH═CH—, —CO—, —OCO—, —COO—, —CF$_2$O—, or —OCF$_2$— such that no oxygen atoms are directly adjacent to each other, and one or more hydrogen atoms in the alkyl group are optionally replaced with halogen; and a is an integer of 1 to 4, wherein if a is 2, 3, or 4, each occurrence of $A^{LC1}$ may be the same or different, and each occurrence of $Z^{LC}$ may be the same or different, with the proviso that compounds represented by general formulas (LC-I) and (II-a) to (II-f) are excluded; and optionally at least one polymerizable compound represented by general formula (VI):

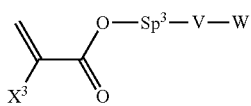 (VI)

wherein $X^3$ is hydrogen or methyl; $Sp^3$ is a single bond, an alkylene group of 1 to 8 carbon atoms, or —O—$(CH_2)_t$— (wherein t is an integer of 2 to 7, and the oxygen atom is linked to the aromatic ring); V is a linear or branched polyvalent alkylene group of 2 to 20 carbon atoms or a polyvalent cyclic substituent of 5 to 30 carbon atoms, wherein the alkylene group in the polyvalent alkylene group is optionally substituted with oxygen such that no oxygen atoms are adjacent to each other and is optionally substituted with an alkyl group of 5 to 20 carbon atoms (wherein the alkylene group in the group is optionally substituted with oxygen such that no oxygen atoms are adjacent to each other) or a cyclic substituent; and W is hydrogen, halogen, or an alkylene group of 1 to 8 carbon atoms.

11. The liquid crystal display device according to claim 1, wherein assuming that a liquid crystal display device without comprising the liquid crystal composition has a maximum transmittance of 100%, the liquid crystal display device comprising the liquid crystal composition has a maximum transmittance of 88.9% or more.

12. The liquid crystal display device according to claim 11, wherein the liquid crystal display device comprising the liquid crystal composition has the maximum transmittance from 88.9% to 89.0%.

* * * * *